(12) United States Patent
Clark et al.

(10) Patent No.: US 6,296,779 B1
(45) Date of Patent: Oct. 2, 2001

(54) METHOD OF FABRICATING A SENSOR

(75) Inventors: William A. Clark, Fremont; Thor Juneau, Berkeley; Roger T. Howe, Martinez, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/255,236

(22) Filed: Feb. 22, 1999

Related U.S. Application Data

(60) Division of application No. 08/865,726, filed on May 30, 1997, now Pat. No. 6,067,858, which is a continuation-in-part of application No. 08/658,924, filed on May 31, 1996, now Pat. No. 5,992,233.

(51) Int. Cl.$^7$ .............................. C03C 15/00; B44C 1/22
(52) U.S. Cl. .................................. 216/66; 216/2; 438/14; 73/504.16
(58) Field of Search ........................ 216/66, 2; 438/14; 73/504.16

(56) References Cited

U.S. PATENT DOCUMENTS

| | | | |
|---|---|---|---|
| 4,882,933 | * 11/1989 | Petersen et al. | 73/517 R |
| 5,025,346 | 6/1991 | Tang et al. | 361/283 |
| 5,203,208 | 4/1993 | Bernstein | 73/505 |
| 5,329,815 | 7/1994 | Dunn et al. | 73/505 |
| 5,349,855 | 9/1994 | Bernstein et al. | 73/514 |
| 5,359,893 | 11/1994 | Dunn et al. | 73/505 |
| 5,377,544 | 1/1995 | Dunn et al. | 73/505 |
| 5,392,650 | 2/1995 | O'Brien et al. | 73/517 |
| 5,408,877 | 4/1995 | Greiff et al. | 73/505 |
| 5,447,068 | 9/1995 | Tang | 73/514 |
| 5,447,601 | * 9/1995 | Norris | 216/2 |
| 5,465,604 | 11/1995 | Sherman | 73/1 DV |
| 5,491,604 | 2/1996 | Nguyen et al. | 361/278 |
| 5,495,761 | 3/1996 | Diem et al. | 73/514 |
| 5,511,420 | 4/1996 | Zhao et al. | 73/514 |
| 5,563,343 | 10/1996 | Shaw et al. | 73/514 |
| 5,565,625 | 10/1996 | Howe et al. | 73/514 |
| 5,583,290 | 12/1996 | Lewis | 73/514 |
| 5,600,064 | 2/1997 | Ward | 73/504 |
| 5,600,065 | 2/1997 | Kar et al. | 73/504 |
| 5,610,334 | 3/1997 | Fima et al. | 73/504 |
| 5,627,317 | 5/1997 | Offenberg et al. | 73/514 |
| 5,627,318 | 5/1997 | Fuji et al. | 73/514 |
| 5,721,162 | * 2/1998 | Schubert et al. | 438/52 |
| 5,734,105 | * 3/1998 | Mizukoshi | 73/504.02 |
| 5,952,574 | * 9/1999 | Weinberg et al. | 73/504.16 |

OTHER PUBLICATIONS

Y. Gianchandani, et al., "Micron–sized, High Aspect Ratio Bulk Silicon Micromechanical Devices", *Micro Electrical Systems*, p. 208–212, Travemunde, Germany, Feb. 4–7, 1992.

W. Tang, et al., "Electrostatic Comb Drive Levitation and Control Method", *Journal of Electromechanical Systems*, vol. 1, No. 4, p. 170–176, Dec. 1992.

J. Bernstein, et al., "A Micromachined Comb–Drive Tuning Fork Rate Gyroscope", *Digest IEEE/ASME Micro Electromechanical Systems, (MEMS)Workshop*, p. 143–148, Ft. Lauderdale, FL, Feb. 1993.

(List continued on next page.)

*Primary Examiner*—Randy Gulakowski
*Assistant Examiner*—Shamim Ahmed
(74) *Attorney, Agent, or Firm*—Fish & Richardson P.C.

(57) ABSTRACT

A microfabricated gyroscope to measure rotation about an axis parallel to the surface of the substrate. A voltage differential may be applied between pairs of electrode fingers to reduce the quadrature error. A microfabricated gyroscope includes a vibratory structure and interdigited electrodes having a high aspect ratio.

16 Claims, 22 Drawing Sheets

OTHER PUBLICATIONS

J. Södervist, "Micromachined Gyroscopes", *Sensors and Actuators A*, vol. 43, p. 65–71, 1994.

B. Johnson, "Vibrating Rotation Sensors", International Congress and Esposition, SAE SP–1066, p. 41–47, 1995.

K. Tanaka, et al., "Vibrating Silicon Microgyroscope", Technical Digets of the 13th Sensor Symposium, p. 185–188, Japan, 1995.

J. Choi, et al., "Silicon Resonant Angular Rate Sensor by Reactive ION Etching", *Technical Digest of the 13th Sensor Symposium* p. 177–180, Japan, 1995.

P. Ljung, et al., "Micromachined Two Input Axis Angular Rate Sensor", *ASME Dynamic Systems and Control Division*, p. 957–962, San Francisco, CA, Nov. 1995.

* cited by examiner-

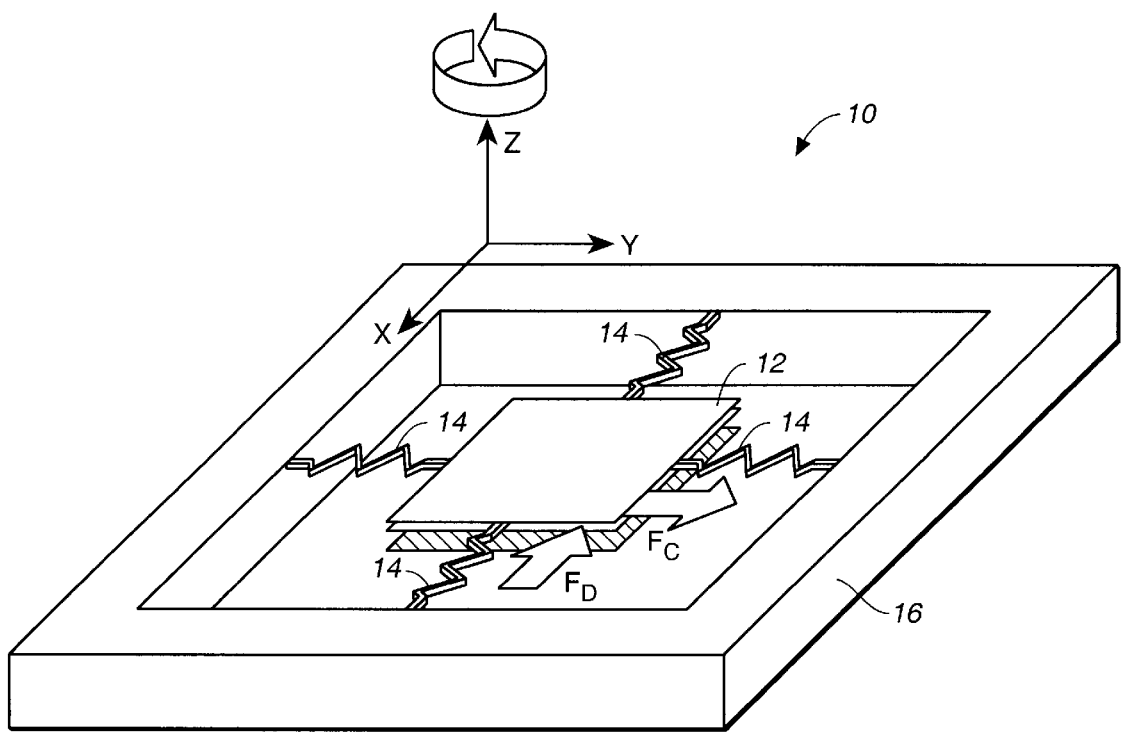
FIG._1

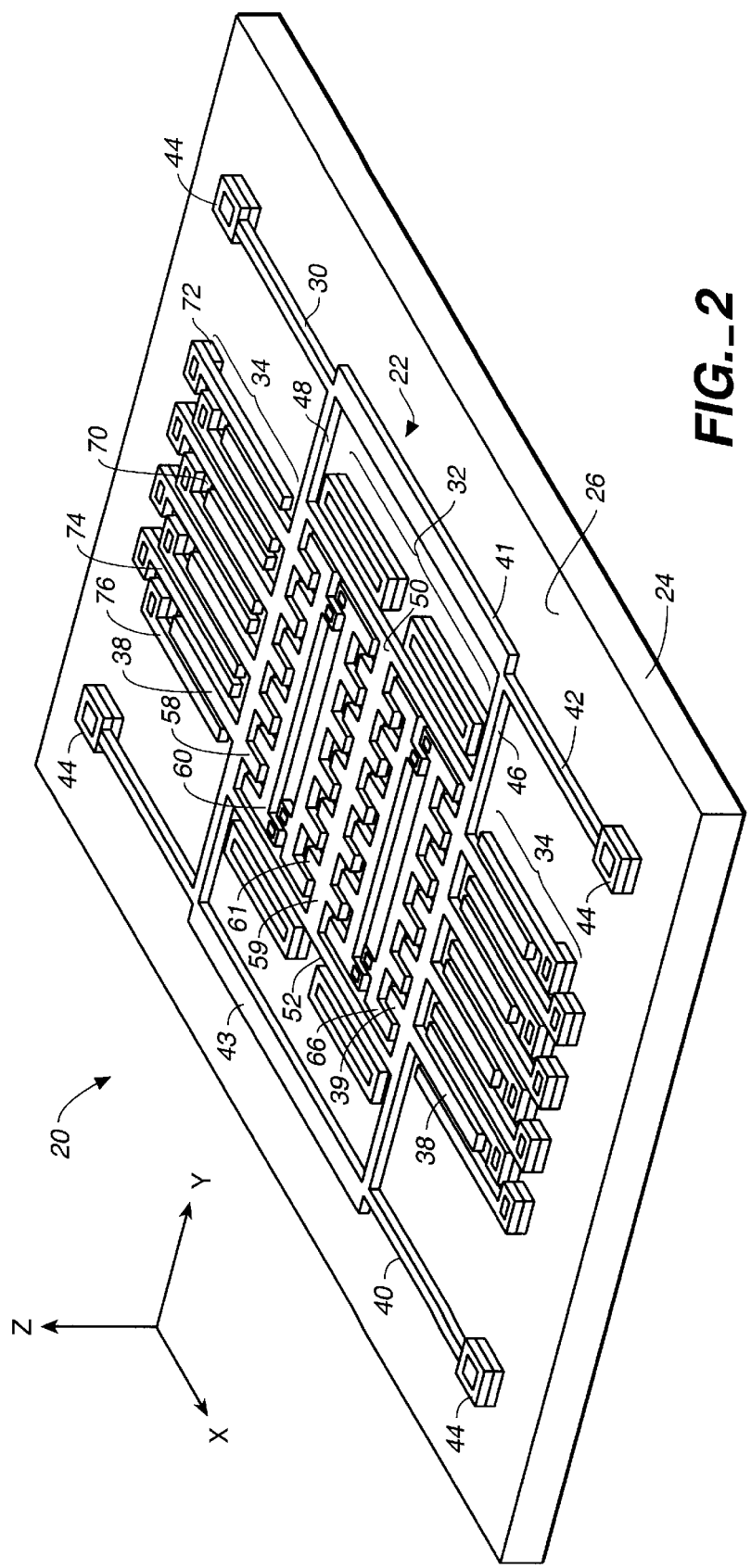
FIG._2

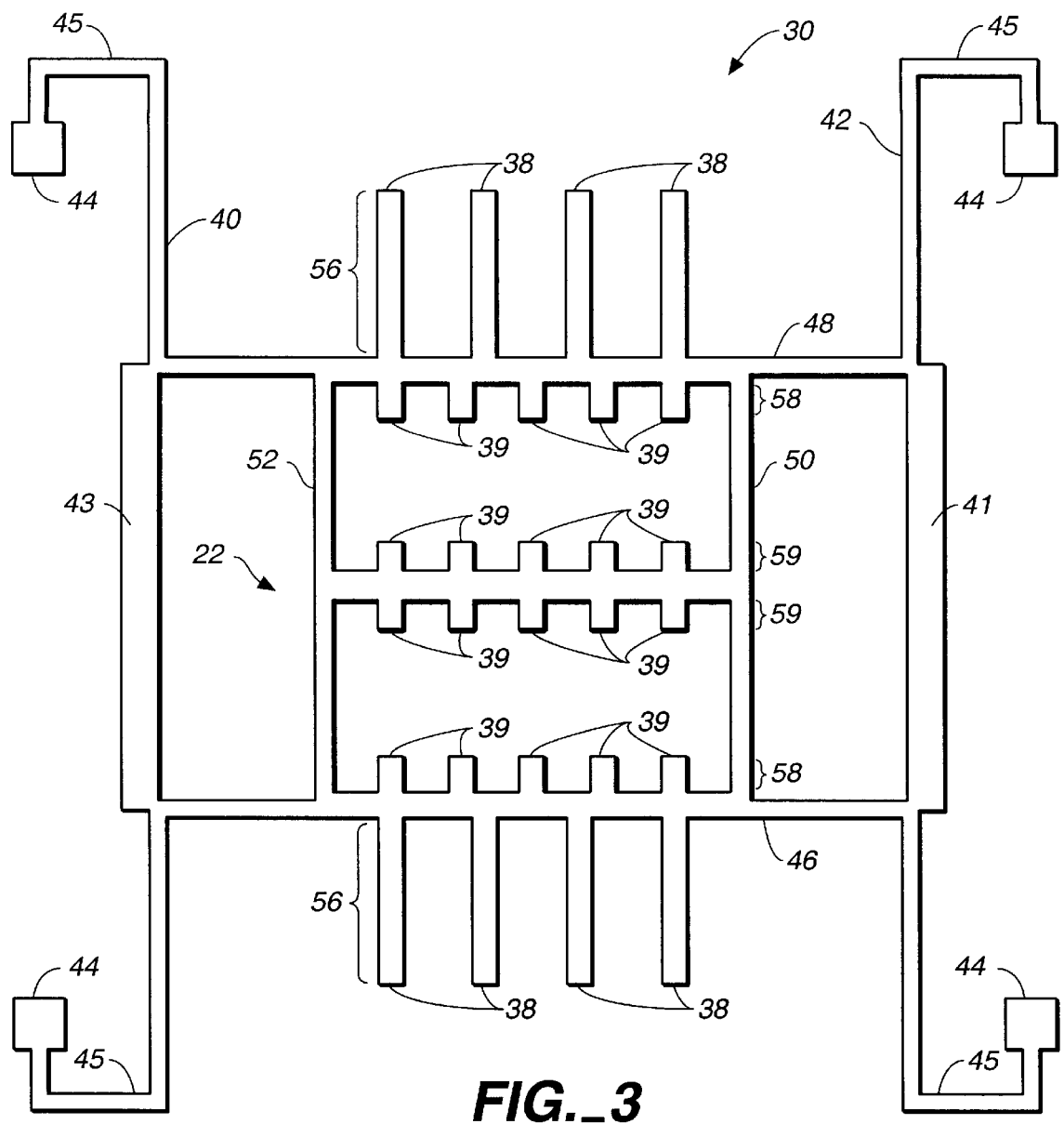
FIG._3

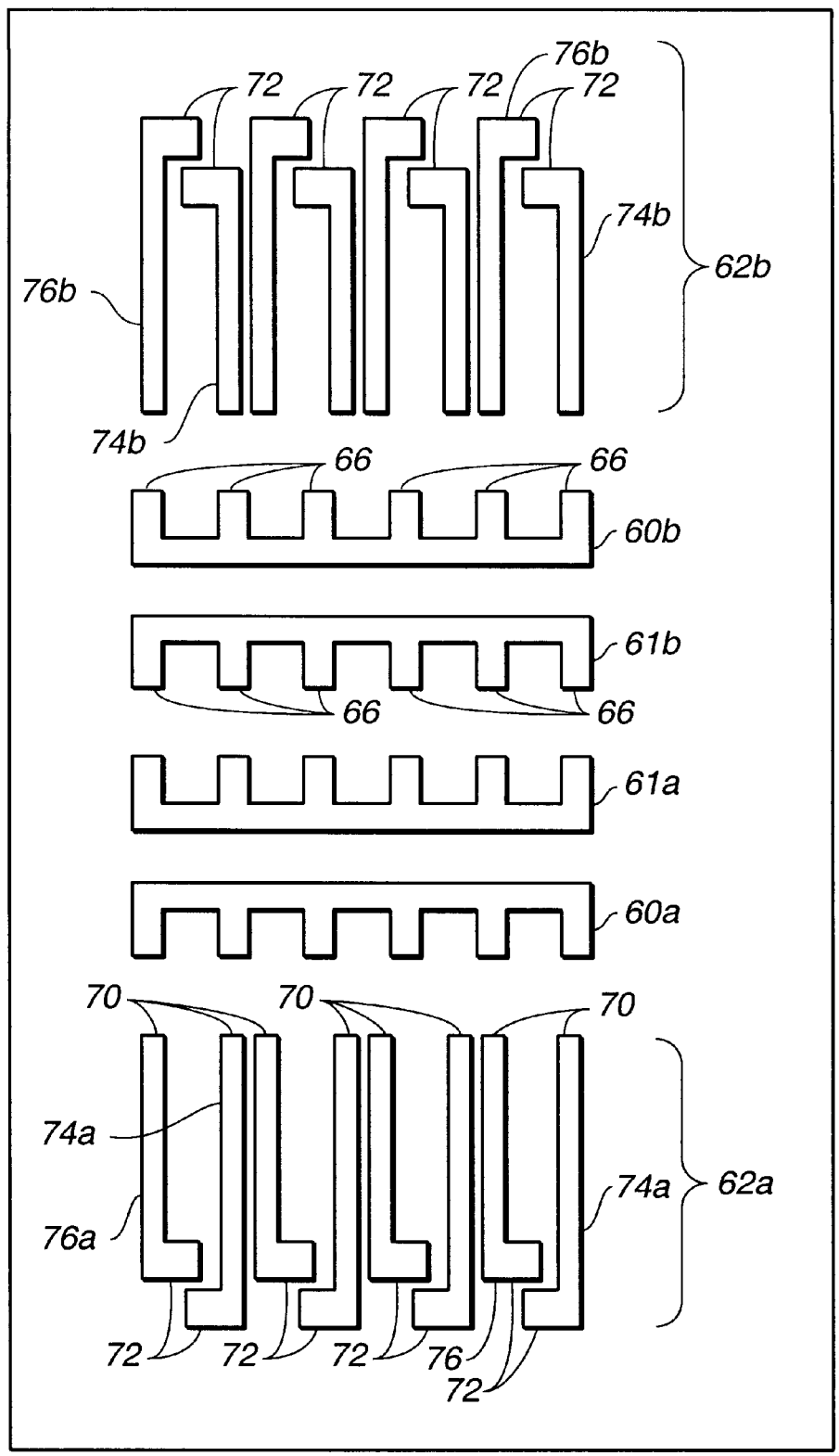
FIG._4

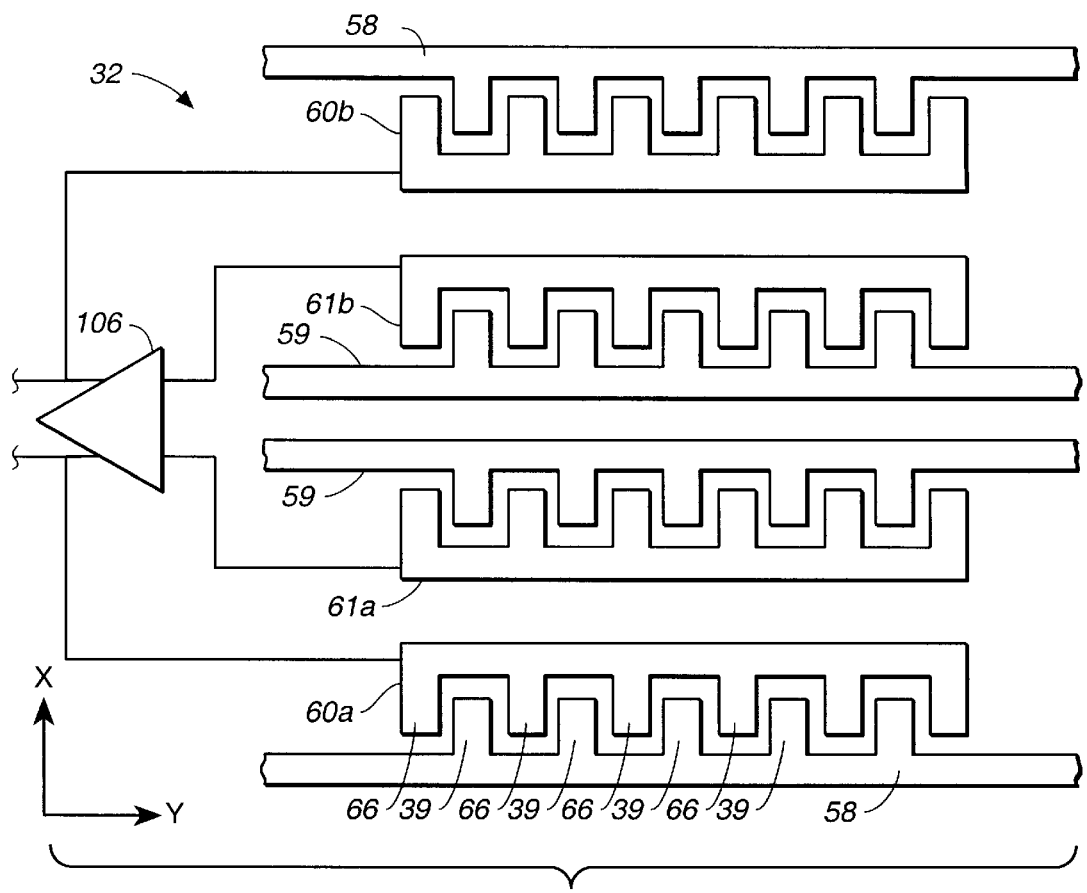
FIG._5
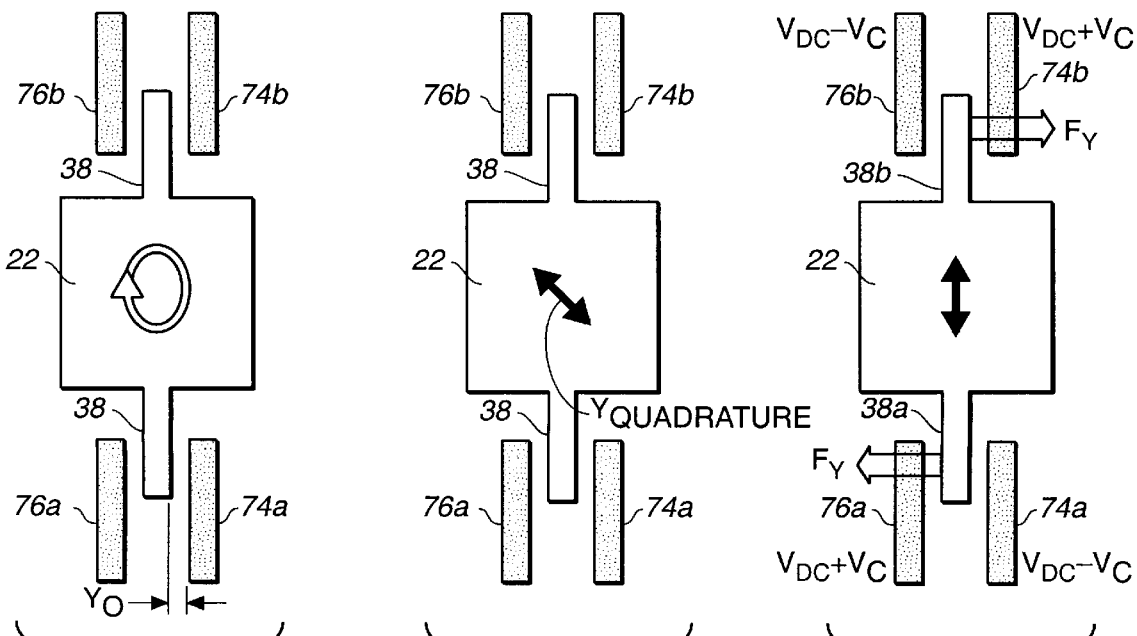
FIG._7A  FIG._7B  FIG._7C

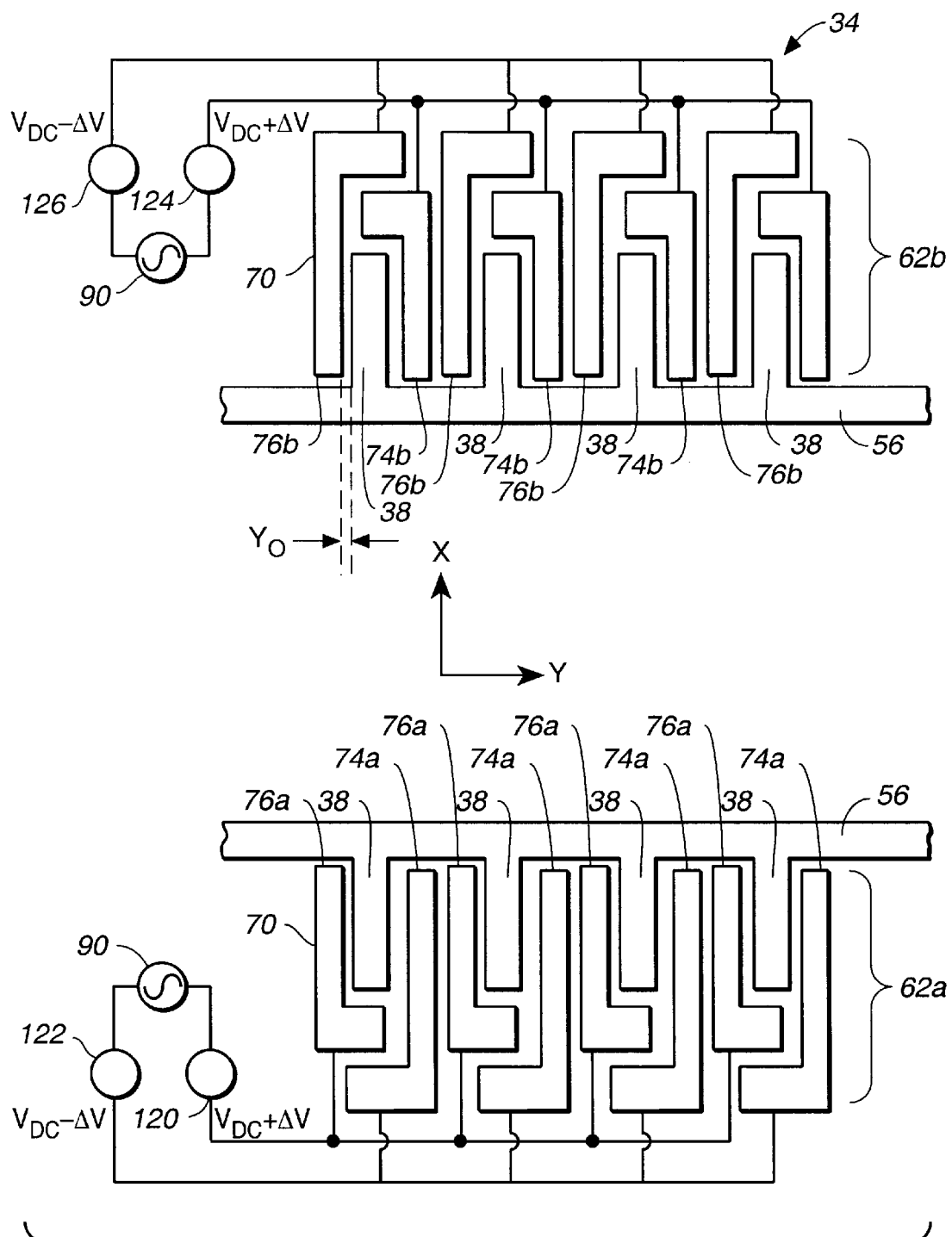
FIG._6

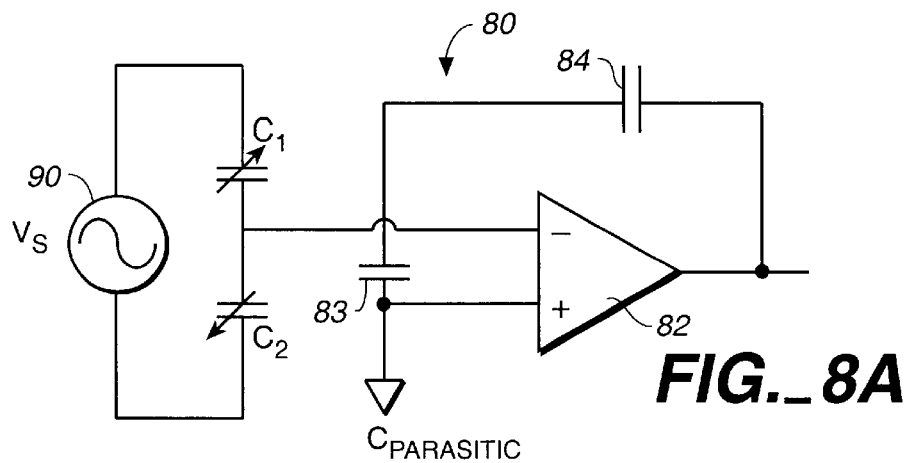
FIG._8A
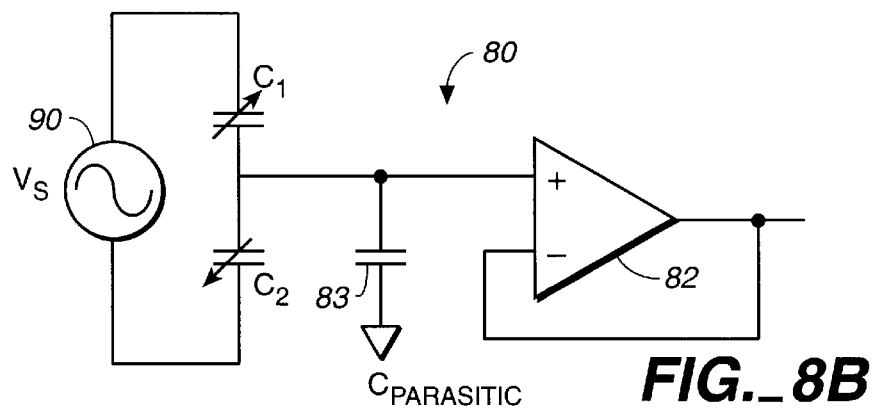
FIG._8B
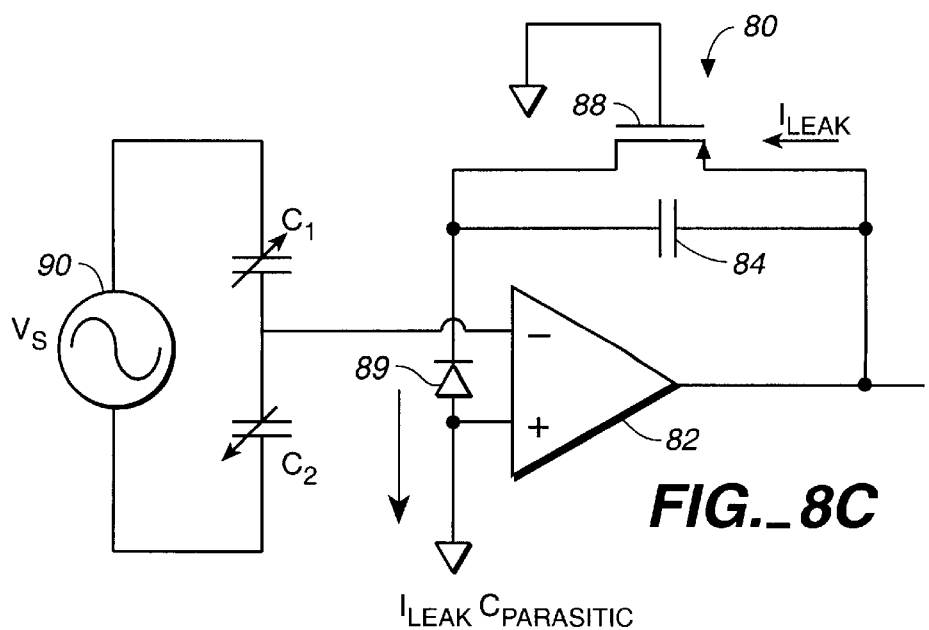
FIG._8C

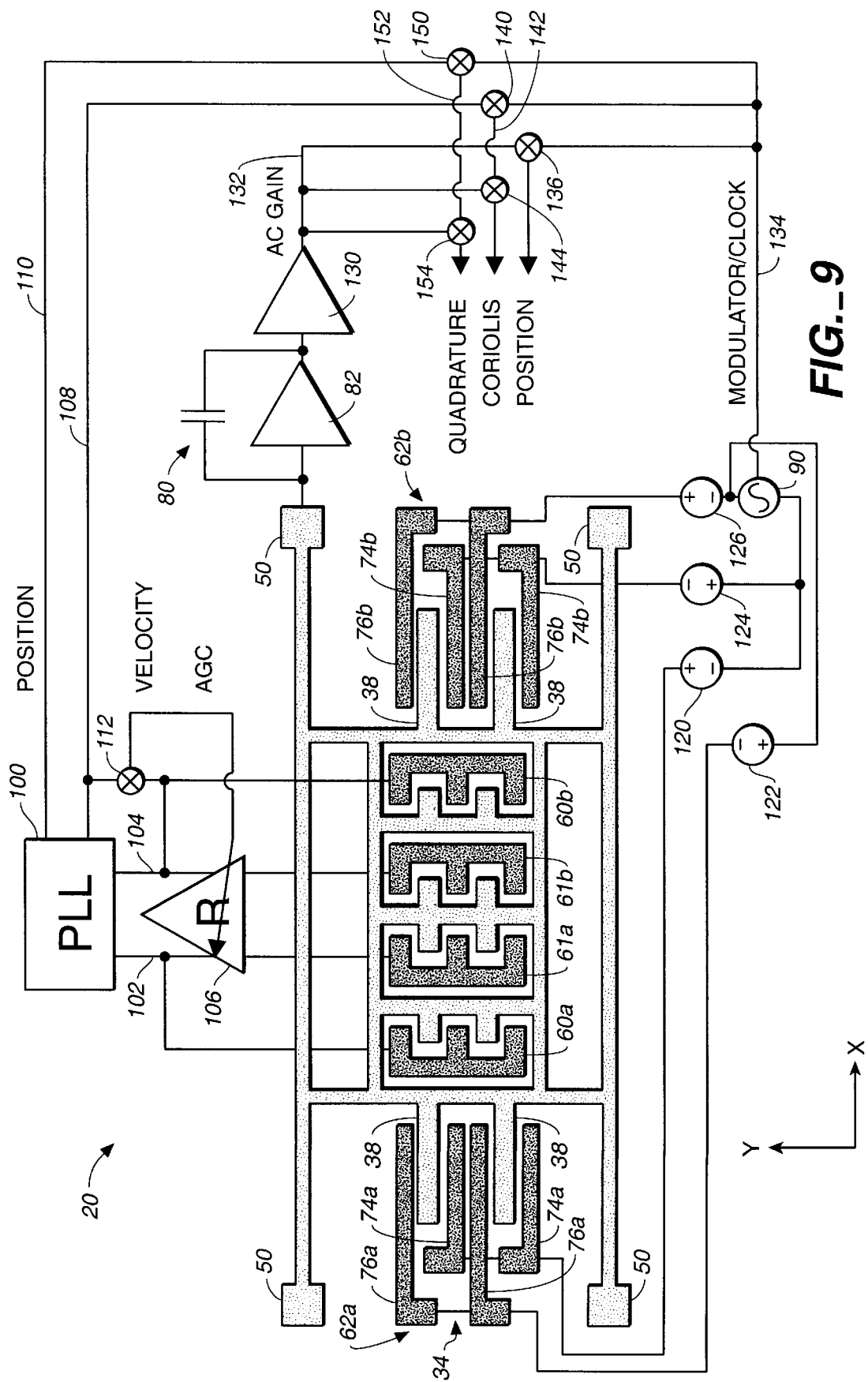
FIG._9

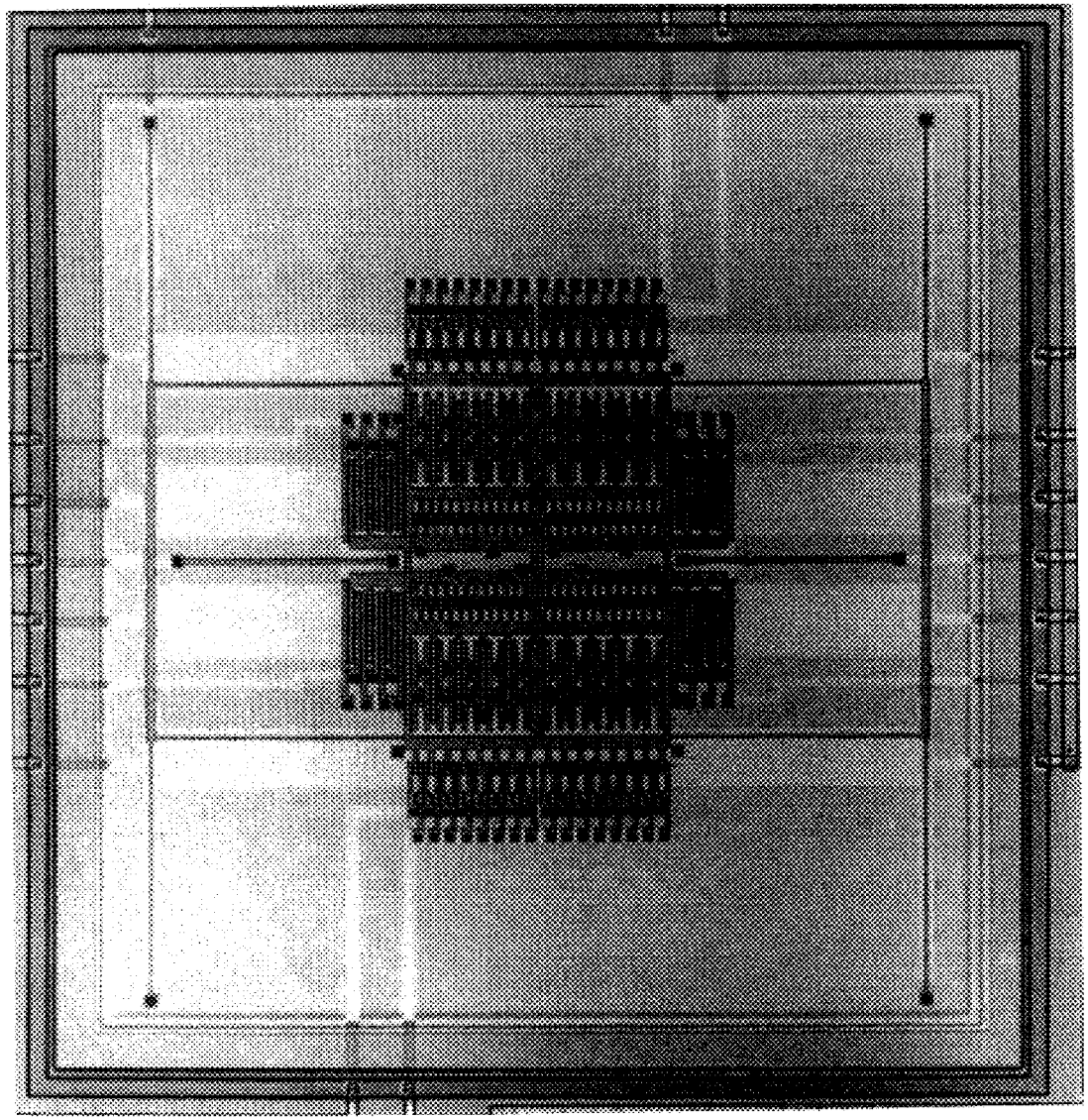
FIG._10

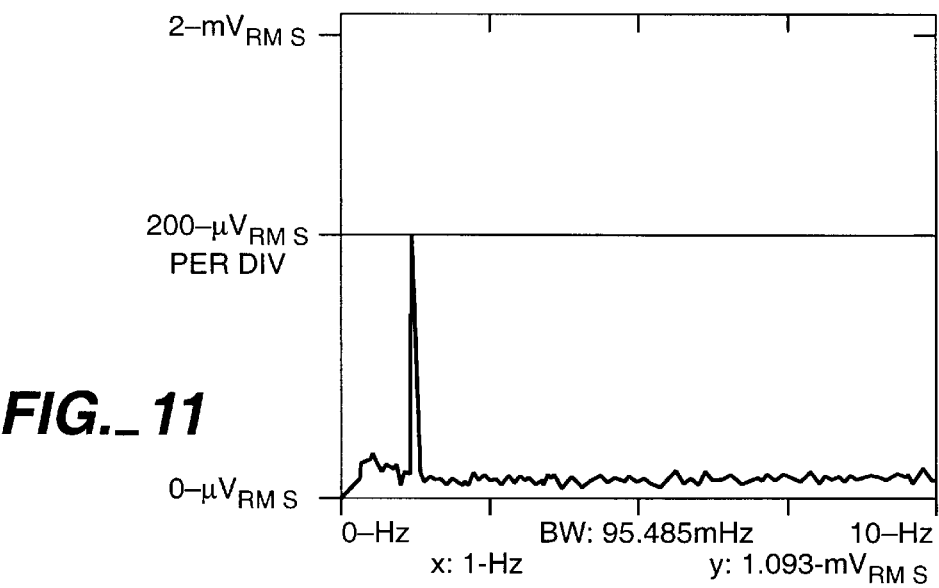
FIG._11
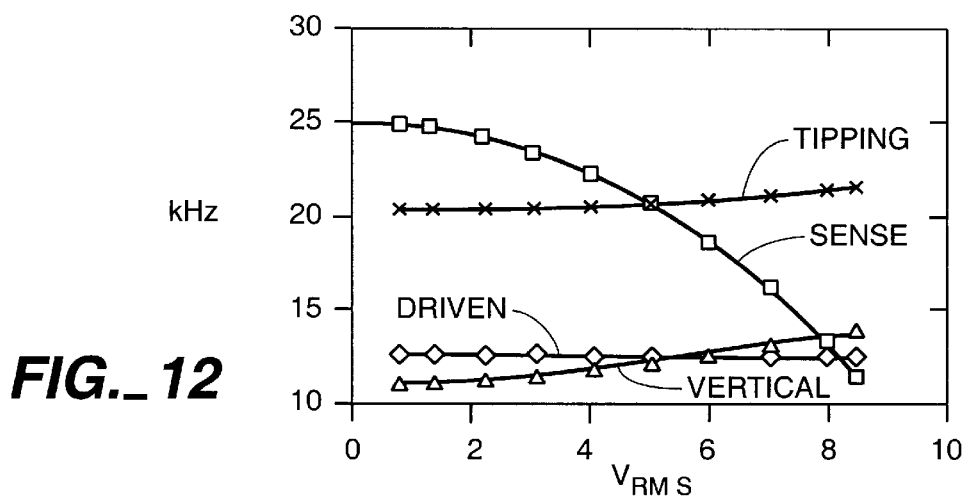
FIG._12
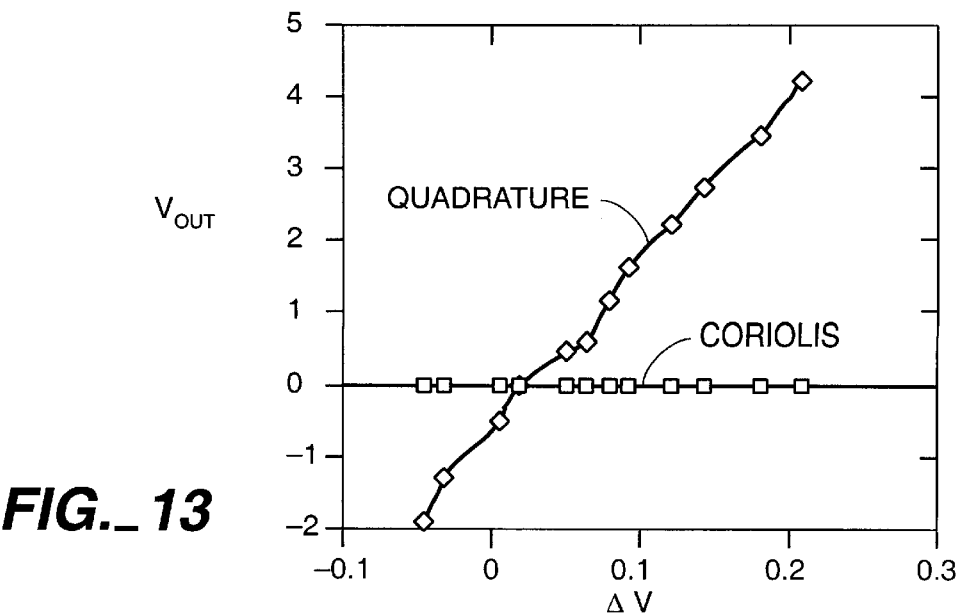
FIG._13

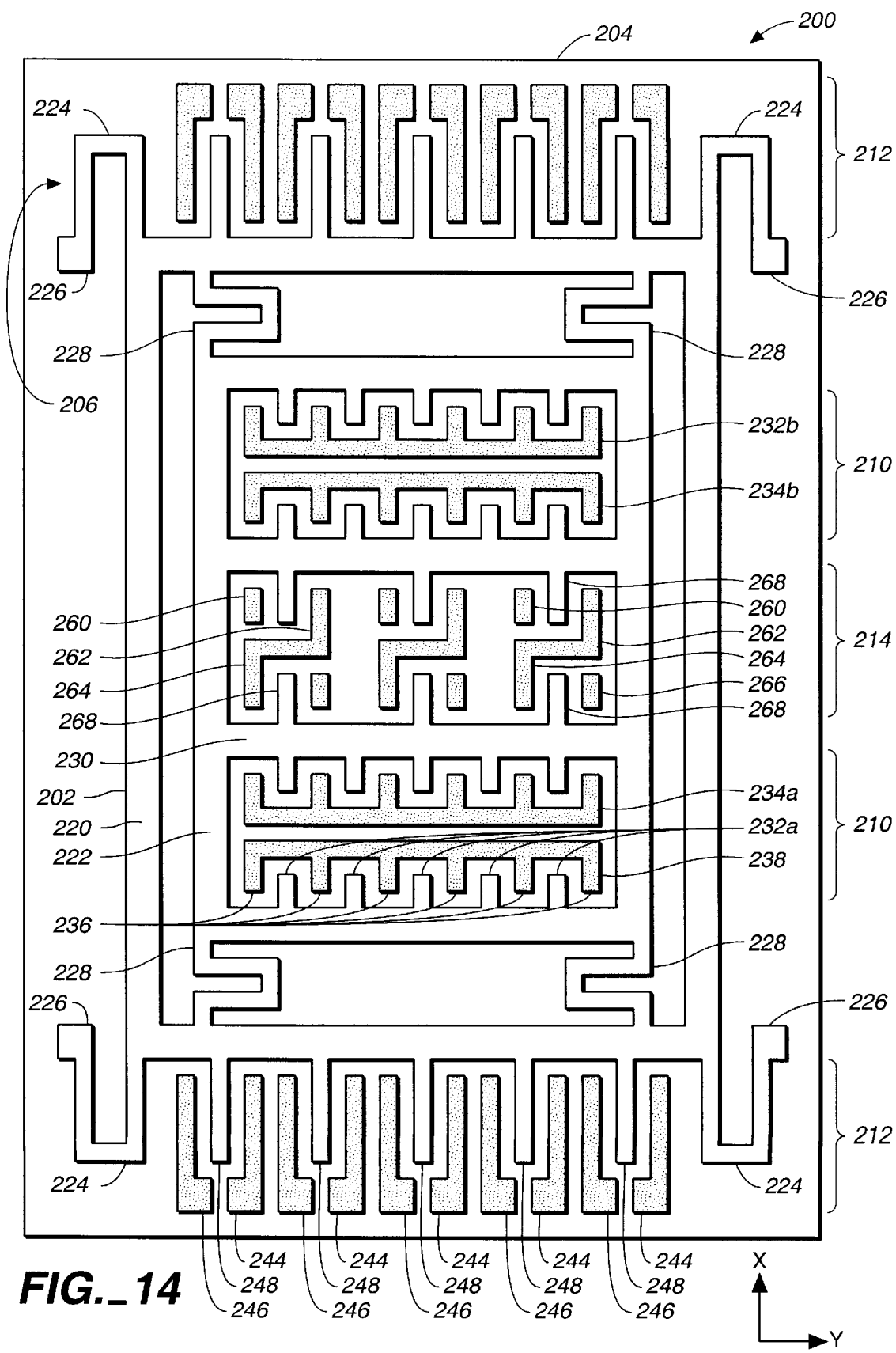
FIG._14

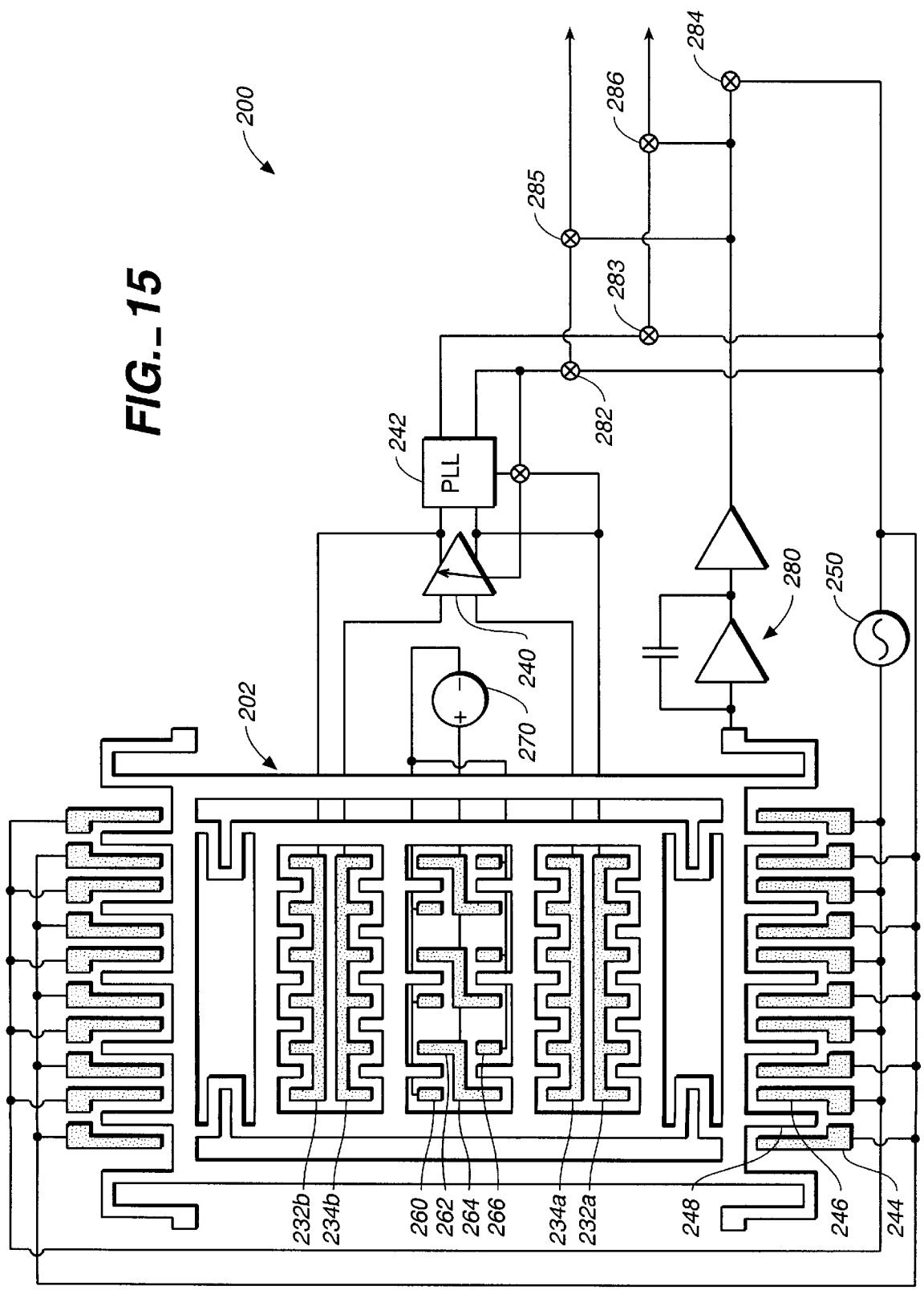
FIG._15

FIG._16
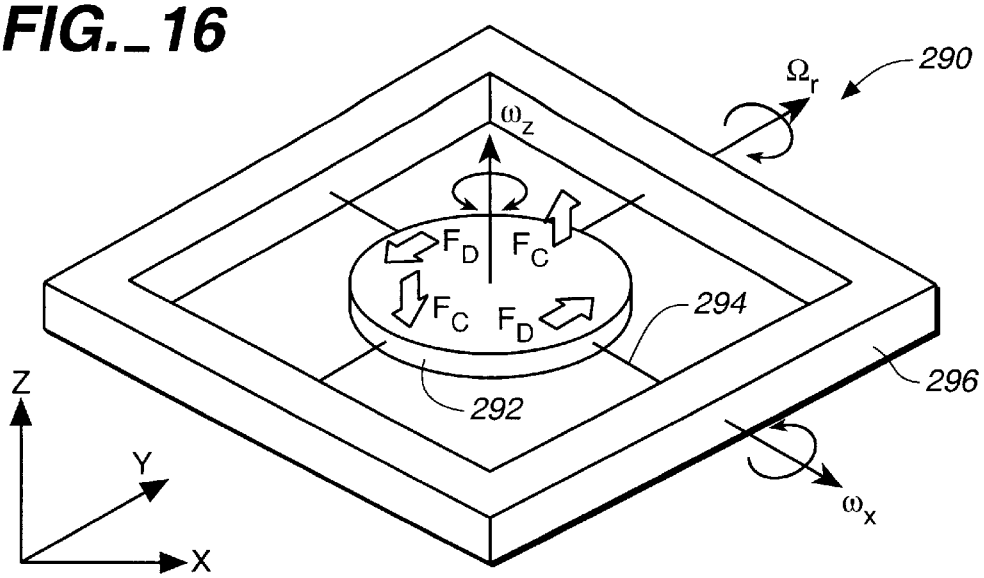
FIG._19
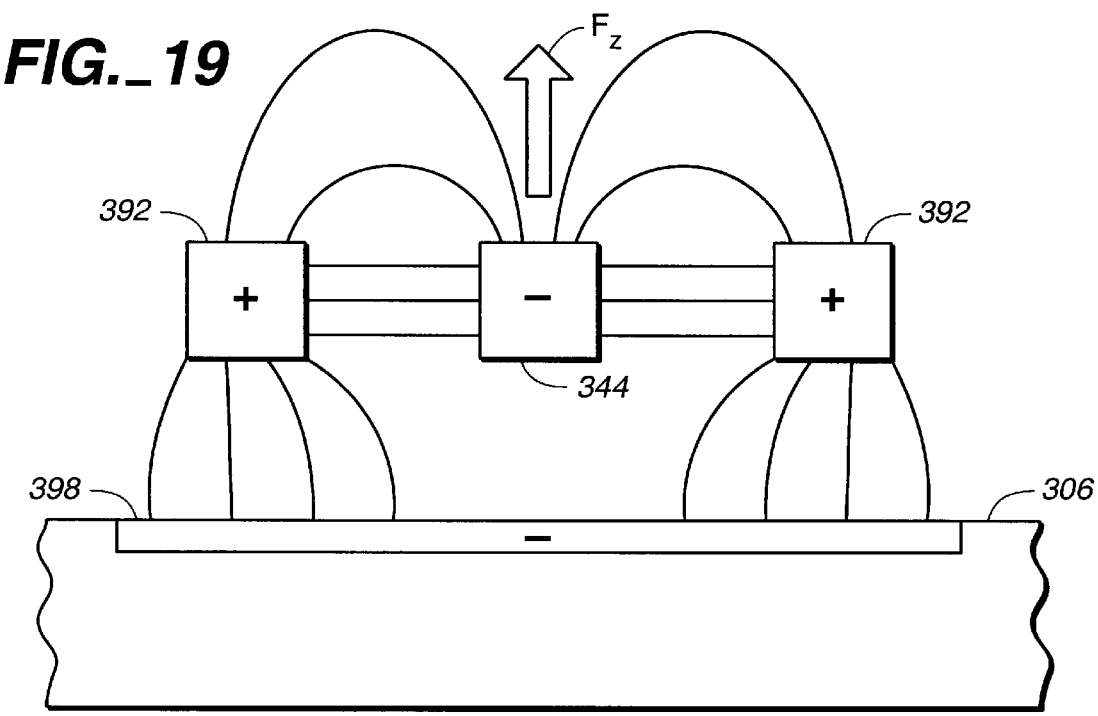

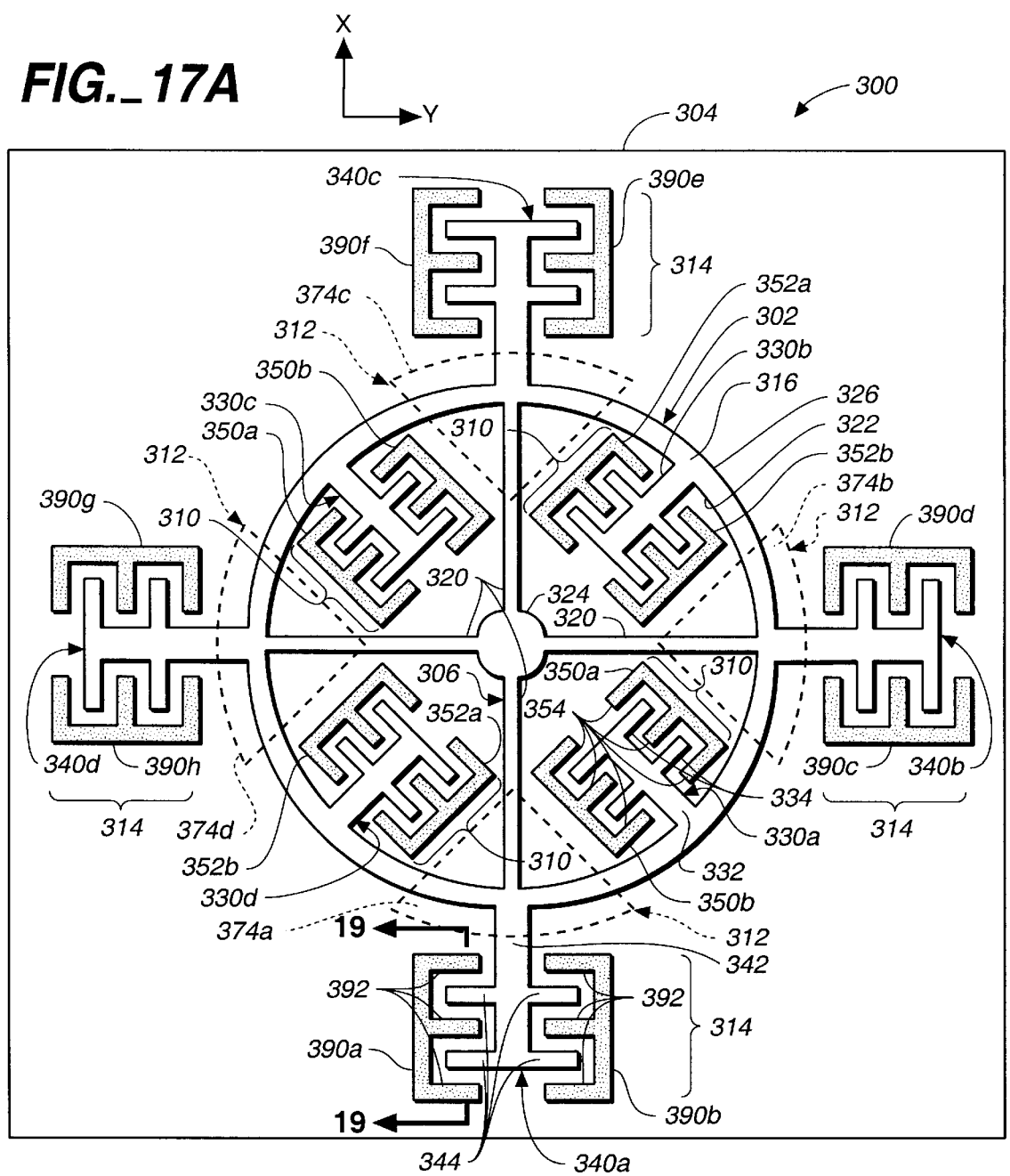
FIG._17A

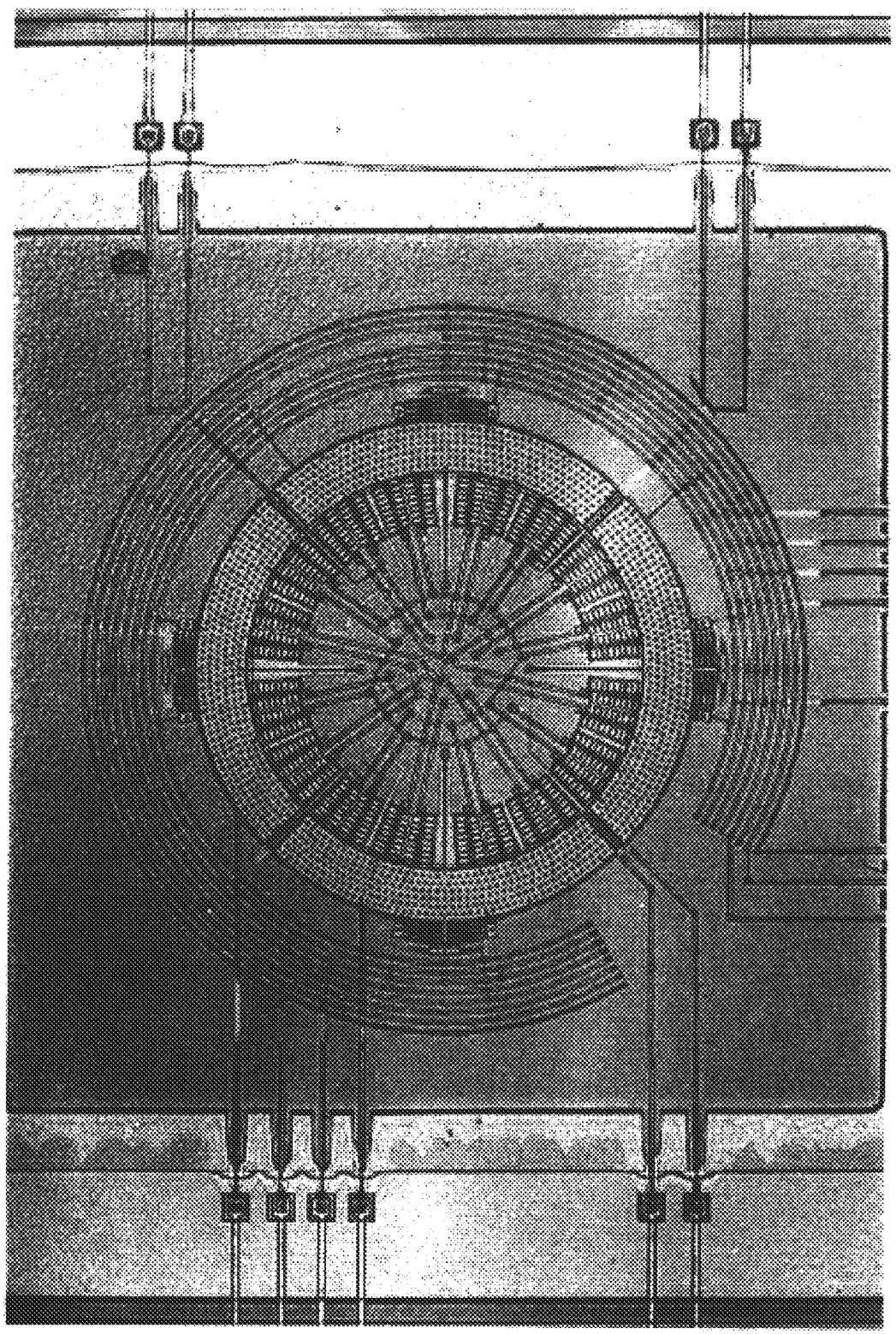
FIG._17B

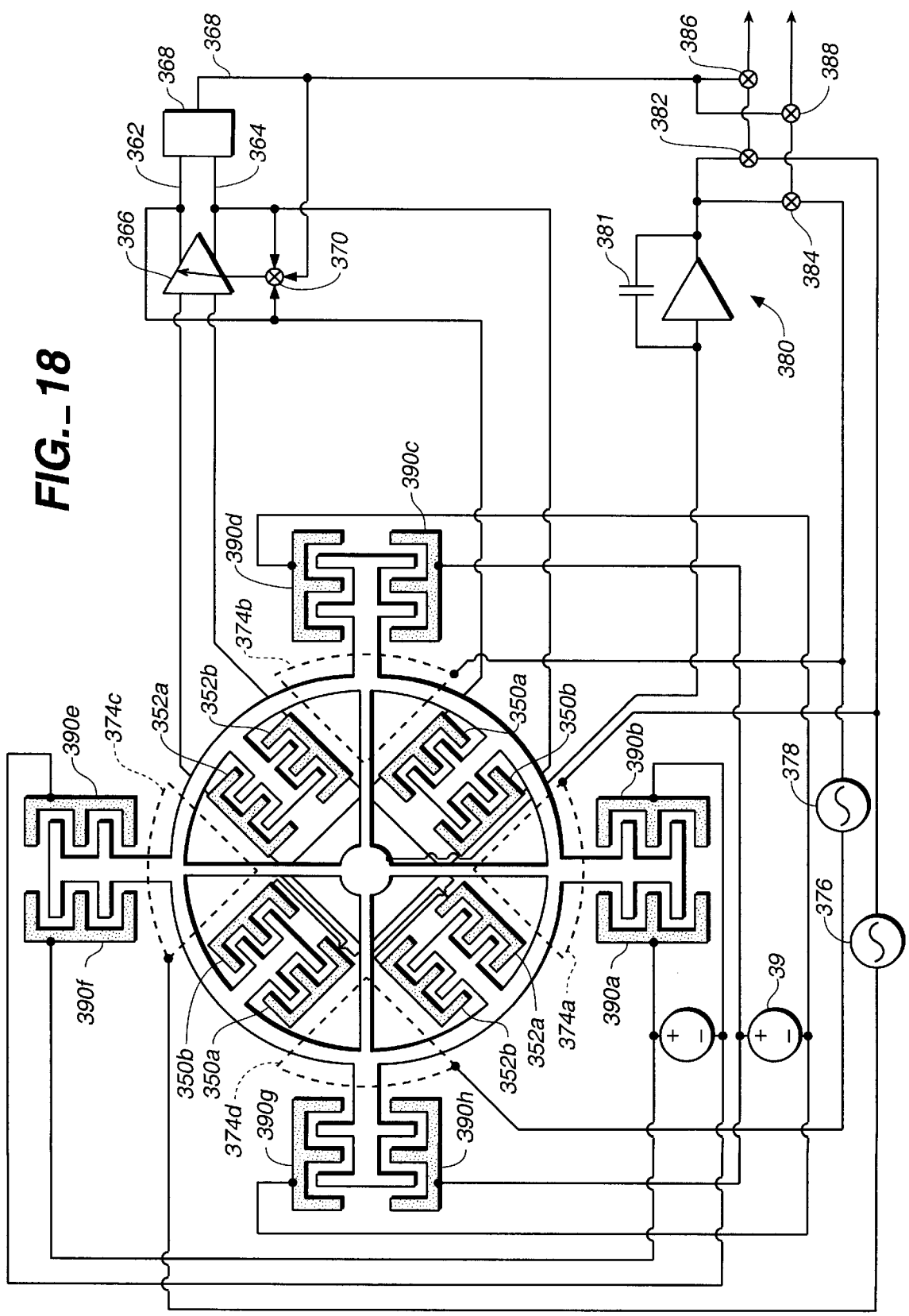
FIG._18

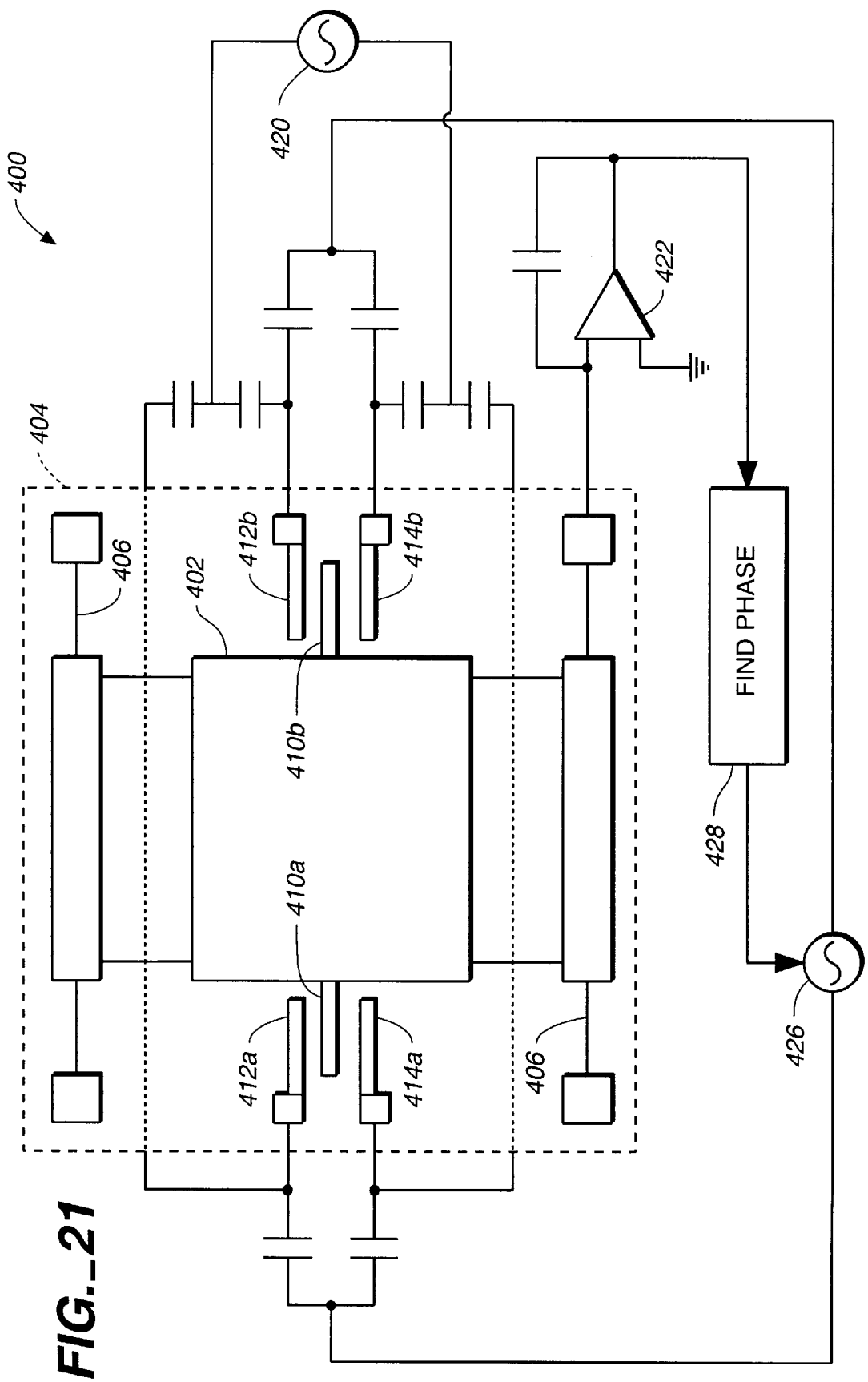
FIG._21

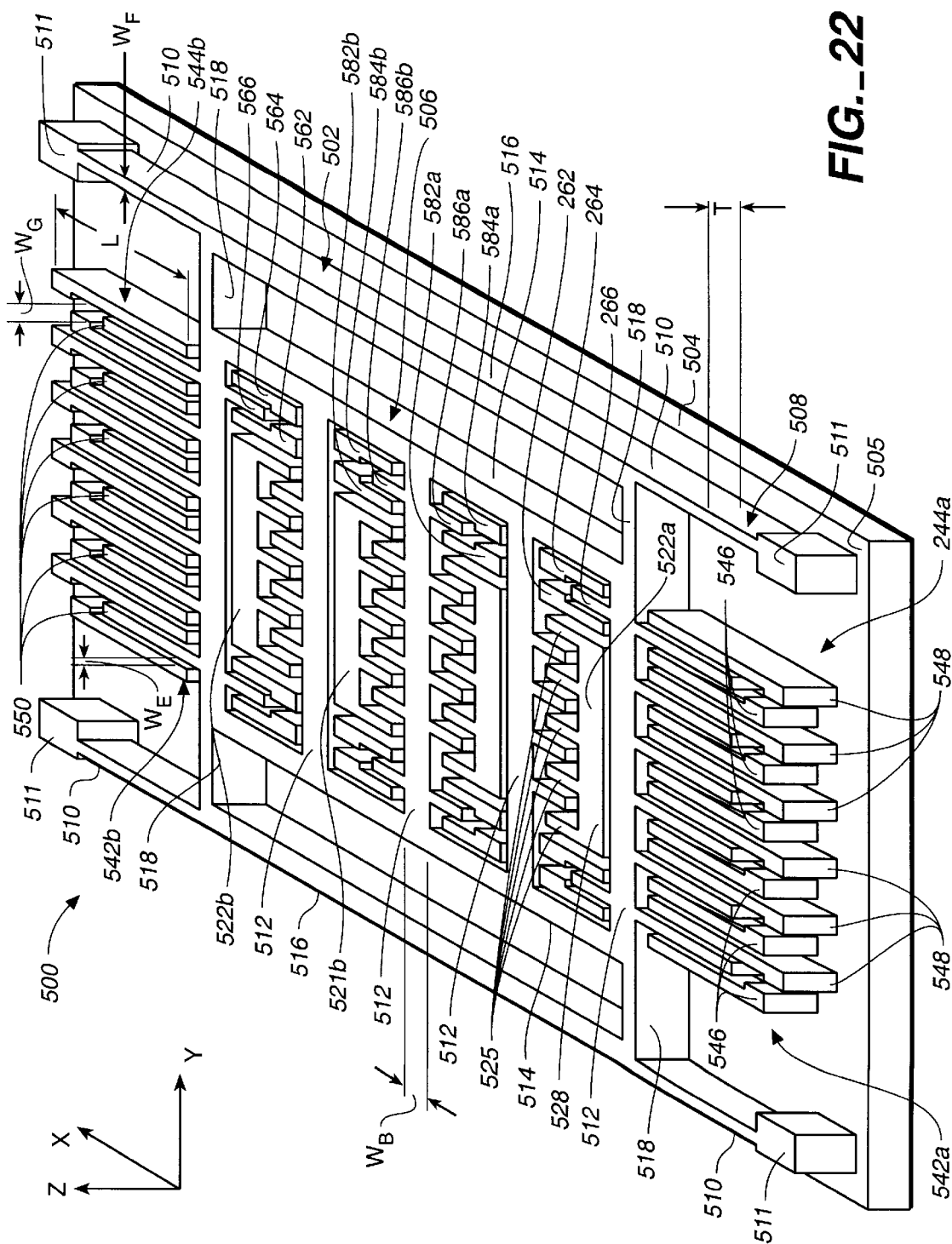
FIG._22

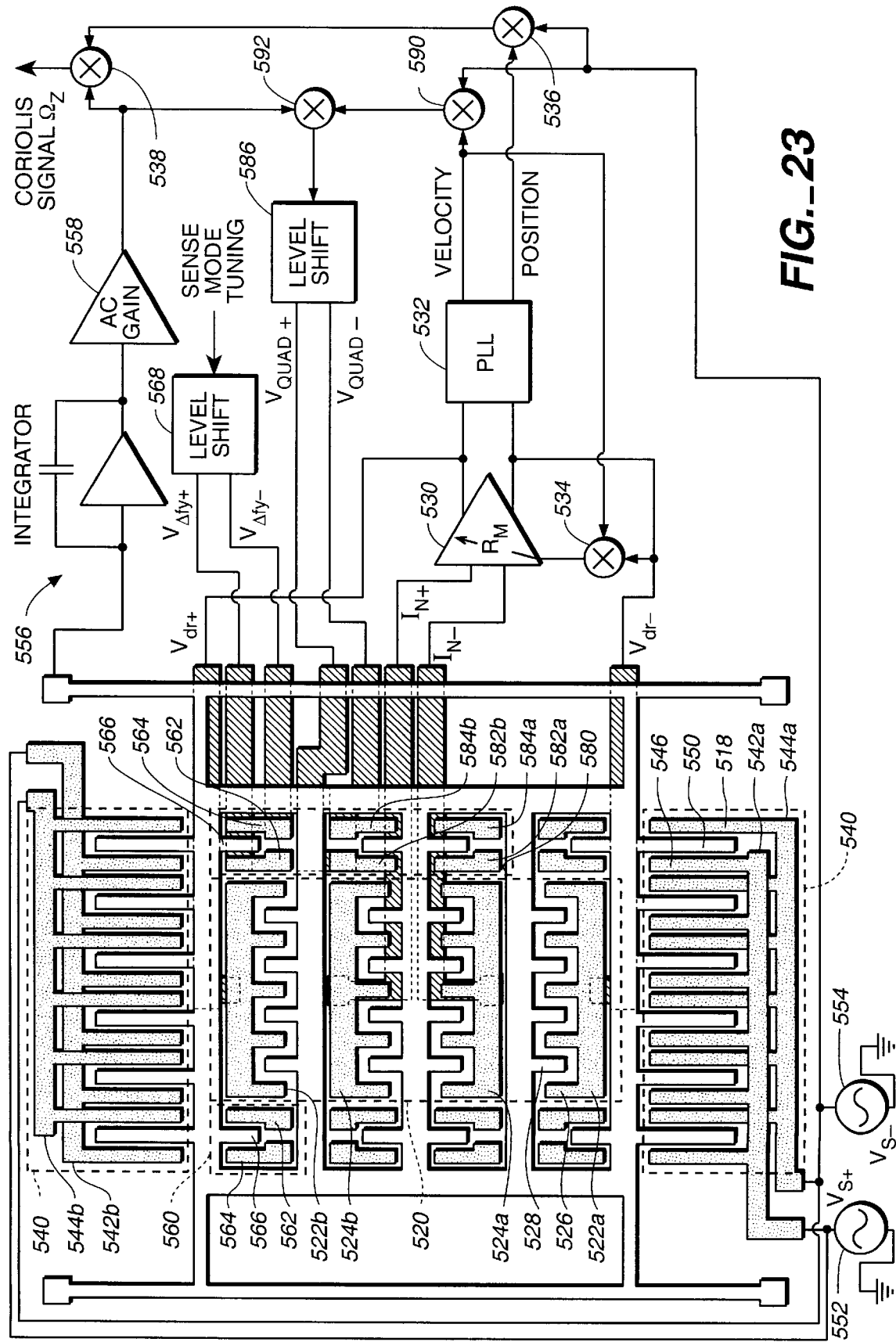
FIG._23

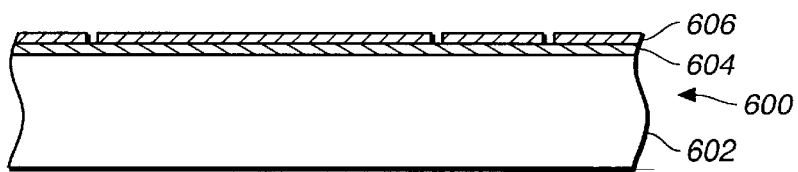
FIG._24A
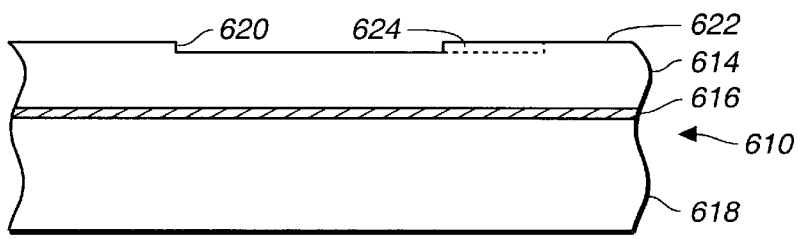
FIG._24B
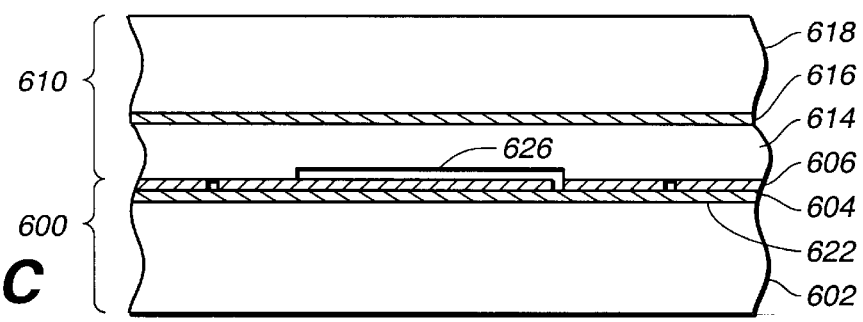
FIG._24C
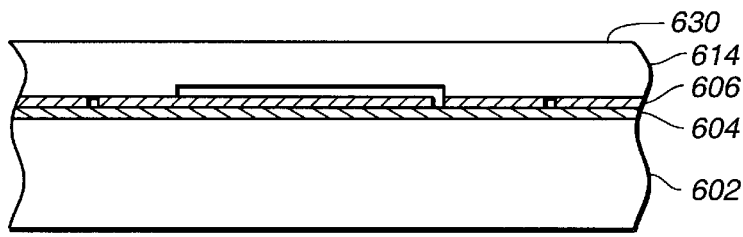
FIG._24D
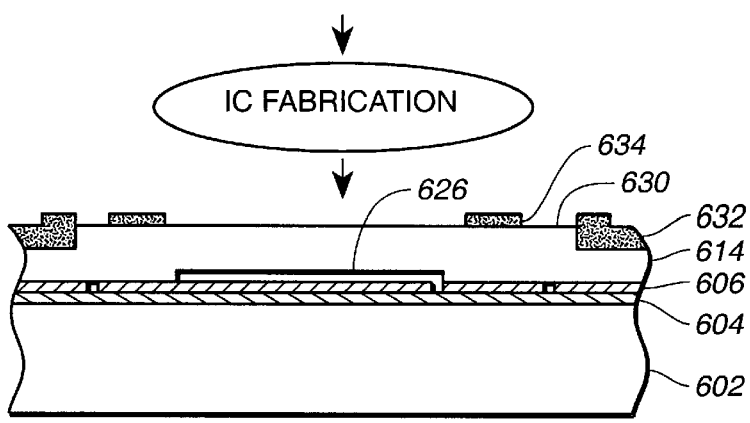
FIG._24E

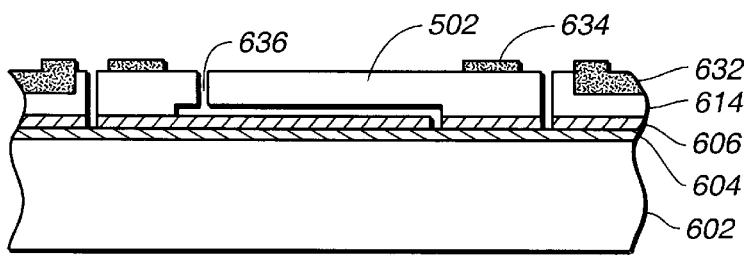
FIG._24F
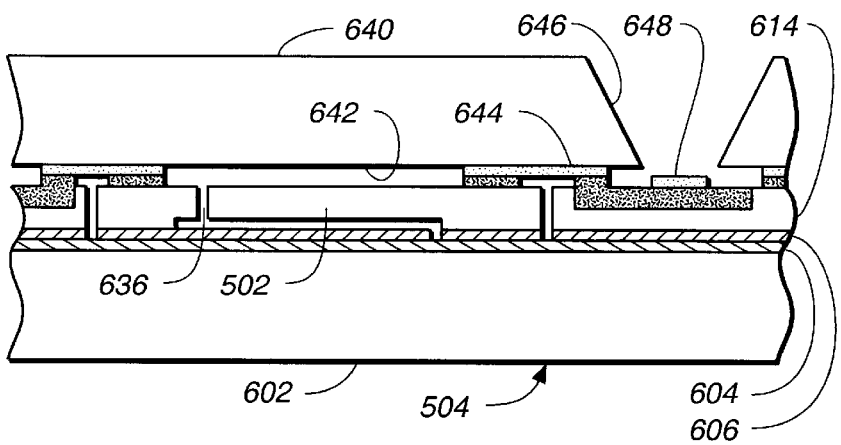
FIG._24G

METHOD OF FABRICATING A SENSOR

CROSS-REFERENCE TO RELATED APPLICATION

This application is a divisional of U.S. application Ser. No. 08/865,726, filed May 30, 1997, U.S. Pat. No. 6,067,858 which is a continuation-in-part of U.S. application Ser. No. 08/658,924, filed May 31, 1996 U.S. Pat. No. 5,992,233. +gi

STATEMENT OF RIGHTS

This invention was made with United States government support under Grant (contract) Number DABT63-93-C-0065 awarded by the Defense Advanced Research Projects Agency (DARPA). The government has certain rights to this invention.

BACKGROUND OF THE INVENTION

The present invention relates generally to microfabricated sensors, and more particularly to microfabricated gyroscopic sensors.

Multi-axis sensors are highly desirable for inertial sensing of motion in three dimensions. Previously, such sensors were constructed of relatively large and expensive electromagnetic devices. More recently, micromechanical sensors have been fabricated using semiconductor processing techniques. Specifically, micromechanical accelerometers and gyroscopes have been formed from silicon wafers by using photolithographic techniques. Such microfabricated sensors hold the promise of large scale production and therefore low cost.

One objective in the construction of microfabricated sensors is to increase the sensitivity and improve the signal to noise ratio of the device. Another objective is to simplify the fabrication steps so as to reduce the cost and complexity and to increase the yield in the manufacturing process.

The integration of three gyroscopic sensors to measure the rotation rates about the three separate axes coupled with three accelerometric sensors to measure the acceleration along the three axes on a single chip would provide a monolithic, six degree-of-freedom inertial measurement system capable of measuring all possible translations and orientations of the chip.

It would be useful to provide a gyroscopic sensor to measure rotation about axes parallel to the surface of a substrate on which the gyroscopic sensor was fabricated. It would also be useful to provide a gyroscopic sensor with reduced noise.

SUMMARY OF THE INVENTION

In one aspect, the invention is directed to a microfabricated gyroscopic sensor for measuring rotation about an input axis. The gyroscopic sensor includes a substrate, a mass, and a suspension system connecting the mass to the substrate. A drive system causes the mass to oscillate substantially about a drive axis, and a position sensor measures a rotation of the mass about a sense axis. Rotation of the mass about the input axis and oscillation of the mass about the drive axis generates a Coriolis force to oscillate the mass about the sense axis. A voltage source to apply a voltage between a plurality of electrodes associated with the substrate to cause the mass to oscillate, in the absence of the Coriolis force, more precisely about the drive axis.

Implementations of the invention include the following. A processor may be coupled to an output of the position sensor to generate a signal varying with the rate of rotation of the mass about the axis of rotation. A second voltage source may apply a second voltage between electrodes connected to the mass and the electrodes connected to the substrate to adjust a resonant frequency of oscillations of the mass about the sense axis. The drive axis may be substantially perpendicular to the surface of the substrate and the axis of rotation and sense axis are substantially parallel to a surface of the substrate. The mass may be substantially ring-shaped. First and second pluralities of electrode fingers may project from the mass, and third and fourth pluralities of electrode fingers projecting from the substrate and be interdigitated with the first and second pluralities of electrode fingers. The fourth plurality of electrode fingers may be positioned opposing the first plurality of electrode fingers. Fifth, sixth, seventh and eighth pluralities of electrode fingers may be similarly disposed, and the pluralities of electrode fingers are substantially co-planar. The voltage source may apply a first DC voltage between the third plurality and the fourth plurality of electrode fingers and second DC voltage, which is substantially equal in magnitude and opposite in sign, between the seventh plurality and the eighth plurality of electrode fingers.

In another aspect, the invention is directed to a method of sensing rotation with a gyroscopic sensor including a mass connected to a substrate by a suspension system. The method includes rotating the mass about an input axis and causing the mass to oscillate substantially about a drive axis. The rotation of the mass about the input axis and the oscillation of the mass about the drive axis generates a Coriolis force to oscillate the mass about a sense axis. An oscillation of the mass about the sense axis is measured, a voltage is applied between electrodes associated with the substrate to cause the mass to oscillate, in the absence of a Coriolis force, more precisely about the drive axis.

In another aspect, the invention is directed to a microfabricated gyroscopic sensor. The gyroscopic sensor includes a substrate having a first plurality of electrode teeth, a vibratory structure including a second plurality of electrode teeth and a suspension system connecting the second plurality of electrode teeth to the substrate, the second plurality of electrode teeth interdigited with the first plurality of electrode teeth, a drive system to cause the vibratory structure to oscillate relative to the substrate, and a position sensor to measure a deflection of the mass caused by a Coriolis force. The first and second pluralities of electrode teeth have thicknesses substantially greater than their widths.

Implementations of the invention include the following. The suspension system may include a plurality of flexures having an aspect ratio of at least about 10:1. The first and second pluralities of electrode teeth may have an aspect ratio of at least 5:1 and may be separated by gaps having an aspect ratio of at least 10:1.

In another aspect, the invention is directed to a method of fabricating a gyroscopic sensor. An insulative layer is formed on a first substrate, a recess is formed in a first surface of a second substrate, and the first surface of the second substrate is bonded to the first substrate so that the recess defines an enclosed cavity between the first and second substrates. Circuitry for the gyroscopic sensor is formed on a second surface of the second substrate, and a plurality of trenches are etched in the second substrate from the second surface to the cavity, the plurality of trenches defining a vibratory structure connected to the first substrate.

Implementations of the invention include the following. The vibratory structure may have a thickness of at least 25 microns and the recess may have a depth of about 1 micron. The etching step may comprise a deep reactive ion etch.

Advantages of the invention include the following. The gyroscopic sensor measures rotation about an axis parallel to the surface of the substrate. The gyroscopic sensor has reduced quadrature error. The gyroscopic sensor may include a vibratory structure and interdigited electrodes with a high aspect ratio. The gyroscopic sensor has a significantly reduced noise level.

Other advantages and features of the invention will be apparent from the description which follows, including the drawings and claims.

BRIEF DESCRIPTION OF THE DRAWINGS

FIG. 1 is an schematic illustration of a spring-mass system which is equivalent to an electrostatic gyroscope.

FIG. 2 is a schematic perspective view of a microfabricated gyroscopic sensor according to the present invention.

FIG. 3 is a schematic top view of the movable elements of the gyroscopic sensor of FIG. 2.

FIG. 4 is a schematic top view of the fixed elements of the gyroscopic sensor of FIG. 2.

FIG. 5 is a schematic top view of the drive system of the gyroscopic sensor of FIG. 2.

FIG. 6 is a schematic top view of the sensing system of the gyroscopic sensor of FIG. 2.

FIGS. 7A–7C are schematic illustrations of the motion of the proof mass under the influence of the Coriolis acceleration and quadrature error.

FIG. 8A is a schematic circuit diagram of an integrator used to measure the position of the proof mass in the gyroscopic sensor of FIG. 2.

FIG. 8B is a schematic circuit diagram in which the integrator of FIG. 8A is replaced by a voltage buffer.

FIG. 8C is a schematic circuit diagram in which the integrator of FIG. 8A uses a subthreshold metal oxide semiconductor field effect transistor.

FIG. 9 is a schematic illustration of the signal processing circuitry of a gyroscopic sensor according to the present invention.

FIG. 10 is a photograph of a fabricated gyroscopic sensor.

FIG. 11 is a graph illustrating the response of the gyroscopic sensor to rotation about the Z-axis.

FIG. 12 is a graph illustrating the response of the Y-axis resonant frequency to an applied bias voltage.

FIG. 13 is a graph illustrating the response of the quadrature error to an applied voltage differential.

FIG. 14 is a schematic top view of a gyroscopic sensor in which the sensing, driving and quadrature correcting functions are performed by different electrode structures.

FIG. 15 is a schematic of the circuitry of the gyroscopic sensor of FIG. 14.

FIG. 16 is a schematic illustration of a spring-mass system which is equivalent to a dual-axis electrostatic gyroscope.

FIG. 17A is a schematic top view of a dual-axis gyroscopic sensor according to the present invention.

FIG. 17B is a photograph of a fabricated dual-axis gyroscopic sensor.

FIG. 18 is a schematic illustration of the electronic circuitry of the dual-axis gyroscopic sensor of FIG. 17A.

FIG. 19 is a cross-sectional view along line 19—19 of FIG. 17A schematically illustrating the field lines generated by the quadrature correction electrodes.

FIG. 21 is a schematic illustration of the circuitry of a gyroscopic sensor in which the sensing, driving and quadrature functions are combined in a single electrode structure.

FIG. 22 is a schematic perspective view of a gyroscopic sensor fabricated with a high-aspect-ratio vibratory structure.

FIG. 23 is a schematic circuit diagram of the signal processing circuitry of the gyroscopic sensor of FIG. 22.

FIGS. 24–24G are schematic cross-sectional views illustrating steps in the fabrication of the gyroscopic sensor of FIG. 22.

DESCRIPTION OF THE PREFERRED EMBODIMENTS

Figure 20:
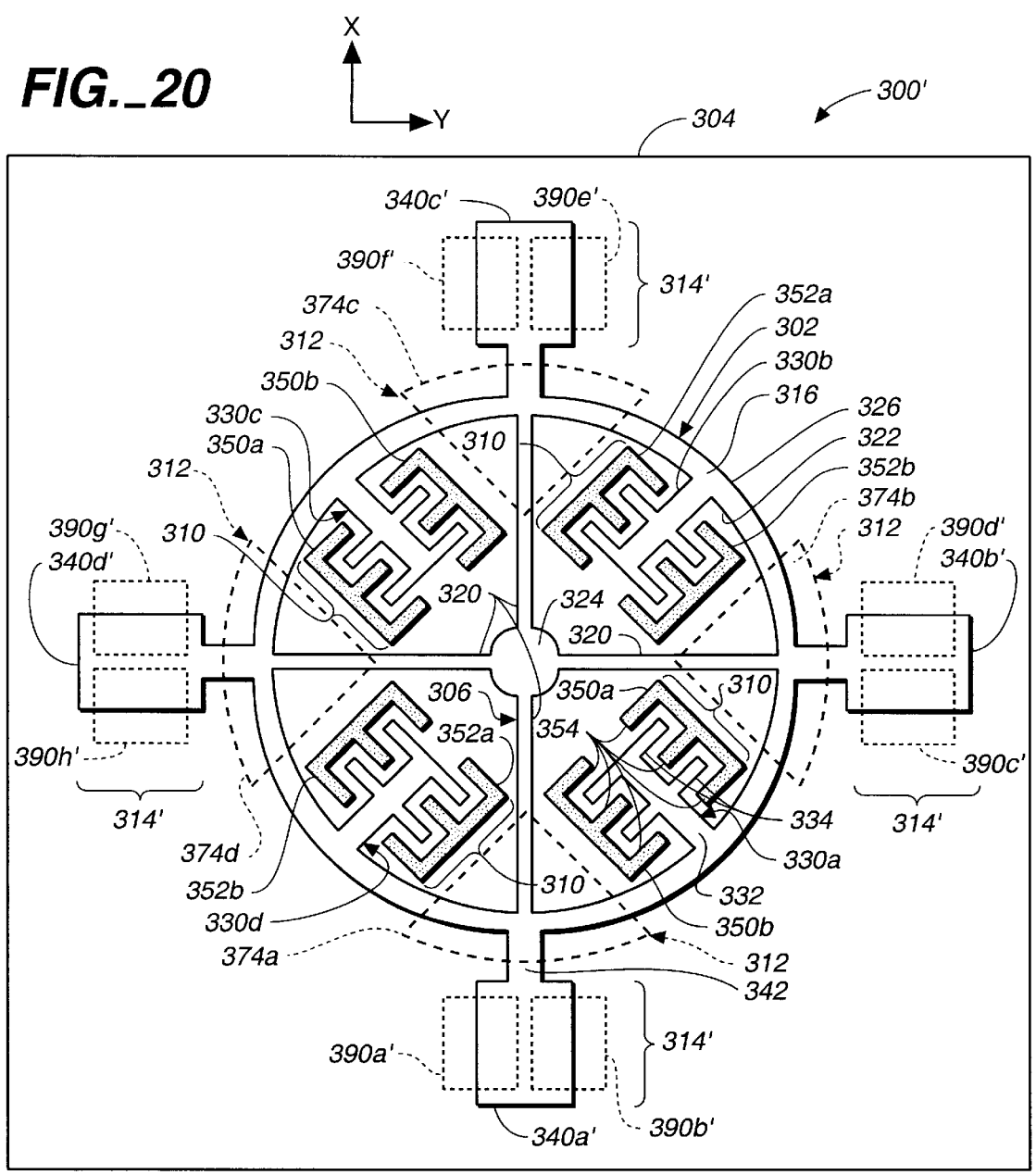
FIG. 20 is a schematic top view of a dual-axis gyroscopic sensor in which the quadrature correction system includes electrode plates.

Referring to FIG. 1, a Z-axis vibratory rate gyroscope functions by generating and sensing Coriolis acceleration. The functional operation of the Z-axis vibratory rate gyroscope of the present invention is illustrated by an equivalent spring-mass system. In a vibratory rate gyroscope 10, a proof mass 12 is supported by a flexible suspension 14 from a rigid frame 16. Proof mass 12 is oscillated along the X-axis (the drive mode) by a drive force $F_D$ as the frame rotates about the Z-axis. The combination of rotation and oscillation generates a Coriolis force $F_c$ along the Y-axis on the oscillating proof mass. The Coriolis acceleration is detected as a deflection of the proof mass along the Y-axis (the sense mode).

Referring to FIG. 2, a micromachined gyroscopic sensor 20 designed according to the present invention includes microelectromechanical sense element or proof mass 22 connected to a rigid frame or substrate 24. The gyroscopic sensor 20 measures the Z-axis vibratory rate, i.e., the rotation of the substrate about the axis normal to the micromachined surface 26 of substrate 24. The micromachined gyroscopic sensor 20 includes three major elements: a suspension system 30, a drive system 32 used to sustain oscillation of proof mass 22 along the X-axis, and a sensing system 34 used both to detect deflections of proof mass 22 along the Y-axis and to apply electrostatic forces to cancel any quadrature error, as will be described in detail below.

Referring to FIG. 3, suspension system 30 may be formed integrally with proof mass 22. Suspension system 30 supports the proof mass so that it may vibrate in a plane parallel to surface 26. Suspension system 30 holds proof mass 22, for example, about two microns above the surface of the substrate. The total mass of proof mass 22 may be about 0.1 to 0.3 micrograms. Suspension system 30 is generally H-shaped, with two parallel beams 40 and 42 positioned generally along the X-axis. Each beam may be about 500 to 1000 microns in length, specifically about 800 microns in length. The end of each beam is connected to an anchor 44 which connects the suspension system to the substrate (see FIG. 2). The end of each beam 40, as shown in FIG. 2, may include a folded or J-shaped flexure 45 (see FIG. 3). Alternately, beams 40 and 42 may be linear.

Two beams or crossbars 46 and 48 connect beam 40 to beam 42. Crossbars 46 and 48 may be about eight-hundred microns long, and are positioned to trisect beams 40 and 42. Two cross-beams 50 and 52 connect crossbars 46 and 48. A third beam or crossbar 54 may connect the center of cross-beam 50 to the center of cross-beam 52. The flexible elements of suspension system 30 are constructed of polysilicon and, for example, have a width and a thickness on the order of two microns. The anchors may be about eight microns square.

The suspension system 30 is designed to be flexible along the X-axis and Y-axis, and as rigid as possible to other modes of vibration. In particular, the suspension system must be substantially rigid to rotation about the Z-axis, as small rotations may degrade the performance of the gyroscopic sensor. Large deflections may also result in the movable electrode fingers crashing into the stationary electrode fingers. The suspension system provides the necessary translational compliance while maintaining rotational rigidity by thickening the portions of beams 40 and 42 located between crossbars 46 and 48 to form trusses 41 and 43. Trusses 41 and 43 may have a width three to four times the width of the remainder of the beams, i.e., about six to eight microns. The portions of crossbars 46, 48 and 54 from which fingers project may have a width of approximately four microns.

The proof mass 22 also includes a plurality of finger electrodes (or simply fingers) which are used to drive and sense oscillations of proof mass along the X-axis and Y axis. A plurality of long fingers 38 project outwardly along the X-axis from crossbars 46 and 48, and a plurality of short fingers or stubs 39 project inwardly along the X-axis from crossbars 46, 48 and 54. The crossbars 46 and 48 form the spines, and long fingers 38 form the prongs of two movable sensing electrodes 56. Similarly, crossbars 46, 48 and 54 form the spines, and short fingers 39 form the prongs of two movable driving electrodes 58 and two movable feedback electrodes 59. The short fingers 39 may be about ten to twenty-five microns in length, specifically fifteen microns in length, whereas the long fingers 38 may be about one-hundred to two-hundred microns in length, specifically one-hundred and fifty microns in length.

Referring to FIG. 4, one or more stationary driving electrodes, one or more stationary feedback electrodes, and one or more stationary sensing electrodes may be rigidly connected to substrate 24. For example, two stationary driving electrodes 60a, 60b may be arranged relative to each other in an opposing configuration. Similarly, two stationary feedback electrodes 61a, 61b may face each other in an opposing configuration. Each stationary driving electrode 60a, 60b and each stationary feedback electrode 61a, 61b includes a plurality of short fingers 66. Stationary driving and feedback electrodes 60a, 60b and 61a, 61b may have a few to dozens of fingers. Short fingers 66 may have a length of approximately 15 microns and a width of approximately three to six microns. The width, for example, may be four microns.

Two stationary sensing electrodes 62a, 62b may face each other in an opposing configuration. Stationary sensing electrodes 62a, 62b include a plurality of long fingers 70. Each long finger 70 protrudes from a base 72. The fingers of stationary sensing electrode 62a are arranged in pairs, each pair including a right finger 74a and a left finger 76a. Similarly, the fingers of stationary electrode 62b are arranged in pairs, each pair including a right finger 74b and a left finger 76b. Each long finger 70 may be approximately one hundred and fifty microns in length, and have a width of approximately four microns.

Referring to FIG. 5, drive system 32 includes movable and stationary driving electrodes 58 and 60a, 60b, and movable and stationary feedback electrodes 59 and 61a, 61b. One set of short fingers 39 is interdigitated with short fingers 66 of stationary driving electrodes 60a, 60b. Another set of short fingers 39 is interdigitated with short fingers 66 of stationary feedback electrodes 61a, 61b. Short fingers 39 of movable electrodes 58 and 59, and short fingers 66 of stationary electrodes 60a, 60b and 61a, 61b may be formed from the same layer of polysilicon prior to the removal of the sacrificial layer so that the fingers may be co-planar.

The driving electrodes of drive system 32 act as electrical-mechanical transducers. By the application of an alternating voltage between stationary driving electrodes 60a, 60b and movable driving electrodes 58, proof mass 22 may be forced to oscillate or reciprocate along the X-axis. The motion along the X-axis induces bending in crossbars 46 and 48 so that proof mass 22 may move toward and away from stationary driving electrodes 60a, 60b. A more detailed explanation of the manner of operating drive system 32 in order to sustain oscillations in proof mass 22 may be found in U.S. Pat. No. 5,025,346, issued Jun. 18, 1991 to Tang et al., entitled Laterally Driven Resonant Microstructures, and assigned to the assignee of the present invention, the entire disclosure of which is incorporated herein by reference; and in U.S. Pat. No. 5,491,608, issued Feb. 13, 1996 to Nguyen, entitled Q-Controlled Microresonators and Tunable Electronic Filters Using Such Resonators, and assigned to the assignee of the present invention, the entire disclosure of which is incorporated herein by reference.

Referring to FIG. 6, sensing system 34 includes stationary sensing electrodes 62a, 62b and movable sensing electrodes 56. The long fingers 38 of movable sensing electrodes 56 and long fingers 70 of stationary sensing electrodes 62a, 62b are interdigitated, with each long finger 38 disposed between a right finger 74a, 74b and a left finger 76a, 76b of sensing electrodes 62a, 62b. The spacing, $Y_0$, between fingers 70 and fingers 38 may be approximately one micron. Fingers 38 and 70 may be formed from the same layer of polysilicon so that the fingers are co-planar. Thus all of the driving and sensing elements may be formed in the same fabrication step. In addition, the driving mode and the sensing mode operate in the X-Y plane parallel to the surface of substrate 24. As will be described in more detail below, sensing system 34 is used to sense the deflection of proof mass 22 along the Y-axis, to apply electrostatic forces to balance and eliminate the effect of quadrature error, and to tune the resonant frequency of Y-axis vibrations of the proof mass.

As discussed above, drive system 32 causes proof mass 22 to oscillate along the X-axis. The position of the proof mass along the X-axis, x(t), is given by the following equation:

$$x(t) = X_0 \sin \omega_x t \tag{1}$$

where $X_0$ is the amplitude of the oscillation and $\omega_x$ is the frequency of the driving voltage (and thus the oscillation frequency). The frequency of the driving voltage, $\omega_x$, may be between 7 kHz and 100 kHz, and the driving voltage may be sufficient to cause the proof mass to undergo a maximum deflection, $X_0$, of about one micron. The magnitude of the Coriolis acceleration, $\ddot{y}_{Coriolis}$, is given by the following equation:

$$\ddot{y}_{P\omega;x\omega sx_t} = 2 \cdot \Omega(t) \times \dot{x}(t) \tag{2}$$

where $106_z(t)$ is the rate of rotation of the proof mass about the Z-axis and $\dot{x}$ is the velocity of the proof mass along the X-axis. Equations 1 and 2 may be combined as follows:

$$\ddot{y}_{P\omega;x\omega sx_t} = 2 \cdot \Omega(t) \cdot x_\theta \cdot \omega \cdot \cos \omega t \tag{3}$$

For a gyroscopic sensor with an oscillation amplitude $X_0=1$ μm, on oscillation frequency $\omega_x=20$ kHz, and an input rotation rate $\Omega_z=1$ deg/sec, the Coriolis acceleration has a magnitude of 0.45 milliG's.

The Coriolis acceleration is an amplitude-modulated signal in which the carrier frequency is the oscillation frequency and the rotation rate modulates the amplitude. The resulting Coriolis acceleration is a dual sideband signal centered on the oscillation frequency. Referring to FIG. 7A, since the Y-axis accelerations are proportional to velocity, the motion of proof mass 22 is elliptical. The maximum deflection of proof mass 22 along the Y-axis will be a few nanometers. The deflection detectable by gyroscopic sensor 20 may be on the order of a picometer.

In an ideal device, the moving electrodes are perfectly aligned with the stationary electrodes so that the only motion caused by drive system 32 is along the X-axis. However, one effect of manufacturing flaws is quadrature error. Referring to FIG. 7B, quadrature error occurs if proof mass 22 oscillates along an axis that is not exactly parallel to the X-axis. If this is the case, then there is some small fraction, $\epsilon$, of the drive oscillation, X(t), which lies along the Y-axis. This quadrature displacement along the Y-axis is given by the following equation:

$$y_{\psi''\gamma\ddot{v}''\gamma''\Omega} = -\epsilon \cdot x(t) \tag{4}$$

If this displacement is differentiated twice, the acceleration, $\ddot{y}_{quadrature}$, due to off-axis oscillation can be determined. This acceleration, given in Equation 5 below, is referred to as quadrature error.

$$\ddot{y}_{\psi''\gamma\ddot{v}''\gamma''\Omega} = \epsilon \cdot X_\eta \cdot \omega^\theta \cdot \sin \omega \cdot t \tag{5}$$

Note the similarity between the quadrature error and the Coriolis acceleration: both are sinusoidal signals centered at the frequency of oscillation. However, the signals can be distinguished by their phase relative to the driven oscillation. Specifically, the Coriolis acceleration is ninety degrees out of phase relative to the drive oscillation, $\omega_x$, whereas the quadrature error is in phase with the driven oscillation.

The quadrature error can be quite large. In fact, the quadrature error may easily exceed the Coriolis acceleration. The ratio of quadrature error and Coriolis acceleration is given by Equation 6:

$$\frac{\ddot{y}_{P\cdot\omega\cdot x\cdot\omega sx.}}{\ddot{y}_{\psi\cdot\gamma u\ddot{y}\cdot\Omega}} = \frac{2\Omega \cdot (t) \cdot X_\eta \cdot \omega.}{\epsilon \cdot X_\eta \cdot \omega^\theta.} = \frac{2\Omega \cdot (t)}{\epsilon \cdot \omega.} \tag{6}$$

Using the previous example of an input rotation rate, $\Omega_z$, of 1 deg/sec and an oscillation frequency, $\omega_x$, of 20 kHz, for the quadrature error to be as small as the Coriolis acceleration, the oscillation direction must be accurate to a factor of 1 part in 3.6 million. Due to manufacturing flaws and other imbalances, the quadrature error may be considerably larger than this. Accordingly, gyroscopic sensor 20 has a mechanism to reduce, or nullify the quadrature error.

Microfabricated gyroscopic sensor 20 may apply electrostatic forces to proof mass 22 through sensing system 34. By selection of the proper electrostatic force, the quadrature error may be nullified. As shown by Equation 5, the quadrature error is directly proportional to position of the proof mass along the X-axis. To cancel this error signal without effecting the Coriolis signal, a balancing force must be applied that is also directly proportional to the position of the proof mass along the X-axis. Gyroscopic sensor 20 applies such a balancing force, using the interdigitated Y-axis position sense fingers.

Referring to FIG. 7C, proof mass 22 is shown with two fingers 38a and 38b projecting from opposite sides of the proof mass. Finger 38a is surrounded by right and left fingers 74a and 76a, whereas finger 38b is surrounded by right and left fingers 74b and 76b. A small voltage differential, $2\alpha V$, is applied between the right finger 74a and left finger 76a. The opposite voltage potential $-2\Delta V$, may be applied between right finger 74b and left finger 76b. This voltage difference creates a balancing force, $F_y$, which counteracts the quadrature error. The balancing force acts on proof mass 22 so that, absent the Coriolis force, fingers 39 vibrate solely along the X-axis. As mentioned above, the balancing force needs to be exactly proportional to the position of the proof mass along the X-axis. An electrostatic force between two charged surfaces is proportional to the overlapping area of the surfaces. Because the overlapping area between fingers 38 and fingers 70 is directly proportional to the position of proof mass 22 along the X-axis, as proof mass oscillates, the position sense capacitors change proportionately. Therefore, the electrostatic balancing force $F_y$ will also be proportional to the position of proof mass 22. Sensing system 34 applies a DC bias voltage $V_{DC}$ to fingers 74a, 74b, 76a and 76b and a voltage differential $Z\Delta V$ between fingers 74a, 74b and 76a, 76b given by Equation 7 below:

$$F_y = \frac{C_{overlap}}{y_0} x(t) \cdot ((V_{DC} + \Delta V)^2 - (V_{DC} - \Delta V)^2) \tag{7}$$

$$= 2\frac{C_{overlap}}{y_0} V_{DC} \Delta V \cdot x(t)$$

where $C_{overlap}$ is the maximum change in capacitance between fingers 70 and fingers 38 as the structure oscillates and $y_0$ is the equilibrium distance between fingers 70 and fingers 38.

By properly selecting the voltage differential $\Delta V$, the quadrature error may be significantly reduced, e.g., by a factor ten to one-hundred. The proper voltage difference may be calculated from Equations (7) and (5) and Newton's law F=ma, as follows:

$$\Delta V = M \frac{\epsilon y_0 \omega_x^2}{V_{DC} C_{overlap}} \tag{8}$$

where M is the mass of proof mass 22. Because the quadrature error is a result of manufacturing defects, the proper voltage differential depends upon the specific structure and may vary from device to device. A voltage differential in the range of 1 mV to 100 mV should be appropriate. The optimum voltage differential to cancel the quadrature error may be determined experimentally (see FIG. 13 which is discussed below).

In addition to canceling the quadrature error, sensing system 34 of gyroscopic sensor 20 may be used to match the Y-axis resonant frequency $\omega_y$ of proof mass 22 to the driving oscillating frequency $\omega_y$. Because gyroscopic sensor 20 is a high Q second order system, the response of proof mass 22 to Coriolis acceleration can be enhanced. As shown by Equation 3, the Coriolis acceleration is a signal centered around the oscillation frequency $\omega_x$. Therefore the relative values of the oscillation frequency $\omega_x$ and the Y-axis resonant frequency $\omega_y$ have a dramatic effect on the response of the sense mode and hence the sensor sensitivity. If the Y-axis resonant frequency is matched to the oscillation frequency, the device may experience a gain of Q in the system response. However, the bandwidth of the sensor is then limited to $\omega_y/Q$. Given that system is run in a vacuum and Q is typically greater than 10,000, the system bandwidth for $\omega_x=\omega_y$ will be only a few Hertz.

For larger bandwidth and increased sensitivity, gyroscopic sensor 20 is operated with a slight mismatch between resonant frequency 107$_y$ and oscillation frequency 107$_x$. The system response of Y-axis displacement due to Coriolis acceleration is given by:

$$\frac{y}{\Omega_z} = \frac{2X_0 \omega_x \sin\omega_x t}{\omega_y^2 + \frac{j\omega_x \omega_y}{Q} - \omega_x^2} = \frac{X_0 \omega_x}{\omega_x \Delta\omega} \sin\omega_x t \quad (9)$$

Provided that there is a means to tune the Y-axis resonant frequency, it is desirable to operate the gyroscopic sensor with a 5–10% frequency mismatch, $\Delta\omega/\omega_x$, yielding a gain of 5–10 in sensitivity. For example, if $\omega_x$ is about 12 kHz, then $\omega_y$ may be set to about 12.5 kHz. Alternately, the frequency mismatch may be reduced to about 1–2%. Reducing the mismatch further might increase the sensitivity but may be difficult to maintain for any length of time because the resonant frequency changes as the temperature of the gyroscopic sensor changes.

Tuning of the Y-axis resonant to improve sensitivity is accomplished using electrostatic "negative" springs, i.e., by applying a DC bias voltage, $V_{DC}$, between proof mass 22 and stationary sensing electrodes 62. When the DC voltage is established between the moving proof mass and the stationary sensing electrode, the resulting attractive force reduces the total spring constant and thus adjusts the resonant frequency.

Using a first-order model for the parallel-plate capacitors, the linearized spring force due to electrostatic forces is given by:

$$F_y = \left[\frac{1}{(y_0 - y)^2} - \frac{1}{(y_0 + y)^2}\right] \frac{y_0 C_s V_{DC}^2}{2} \quad (10)$$

where y is the deflection of the proof mass along the Y-axis away from its equilibrium position.

The Y-axis resonant frequency, $\omega_y$, is given by the following equation:

$$\omega_y = \sqrt{\frac{k_y + k_e}{M}} \quad (11)$$

where $k_y$, is the purely mechanical spring constant, $k_e$ is the electrostatic spring constant and M is the mass of proof mass 22. The mechanical spring constant $k_y$ is primarily a function of the stiffness of suspension system 30.

The electromagnetic spring constant, $k_e$, is given by the following equation:

$$k_e = -2\frac{C_s}{y_0^2} V_{DC}^2 \quad (12)$$

in which $C_s$ is the sense capacitance of the gyroscopic sensor and $y_0$ is the distance between fingers 38 and 70 (see FIG. 7A). $C_s$ depends upon the total number of fingers and the amount of overlapping area, and should be at least 30 femtoFarads (fF). By increasing the number of fingers, $C_s$ may be increased to about one picoFarad (pF). As mentioned above, the spacing $y_0$, between fingers is about one micron. It may be noted that $k_e$ has a negative value, so that as $V_{DC}$ is increased $\omega_y$ is decreased. The system starts with $\omega_y$ larger than $\omega_x$, and the bias voltage $V_{DC}$ is increased, thereby reducing $\omega_y$ until the desired mismatch $\Delta\omega/\omega_y$ is achieved.

The correct valve for $V_{DC}$ may be determined experimentally (see FIG. 12 which is discussed below), but should be in the range of one to ten volts.

In addition to canceling the quadrature error and adjusting the Y-axis resonant frequency, sensing system 34 may be used to negate the effects of centrifugal or centripetal force. As the gyroscope sensor rotates about the Z-axis, a centrifugal force will push the proof mass outwardly (assuming the axis of rotation does not pass exactly through the center of mass of the proof mass). A voltage difference, $V_c$, may be applied between the opposing stationary sensing electrodes 62a and 62b. Because the centripetal force varies at a low frequency, compared to the frequencies of the Coriolis force, a high pass filter may be used to remove the effect of the centripetal force from the output.

Gyroscopic sensor 20 measures the position of proof mass 22 along the Y-axis by capacitive deflection sensing. The interdigitated fingers of sensing system 34 (shown in FIG. 2) are used to sense deflection of the proof mass along the Y-axis. The fingers are arranged in a capacitor bridge so that any deflection of the proof mass results in measurable changes in the relative size of the capacitors. In a first order model, the capacitance of a parallel-plate capacitor is inversely proportional to the distance between the plates.

Referring to FIGS. 6 and 8A, the space between finger 38 of movable sensing electrode 56 and right fingers 74a, 74b of sensing electrodes 62a, 62b forms a first capacitor $C_1$, and the space between finger 38 and left fingers 76a, 76b forms a second capacitor $C_2$. As movable sensing electrode 56 is deflected along the Y-axis, $C_1$ and $C_2$ change. For example, if sensing electrode 56 is deflected leftward, the distance between finger 38 and right fingers 74a, 74b increases, thereby decreasing $C_1$, while the distance between finger 38 and left fingers 76a, 76b decreases, thereby increasing $C_2$. The change in capacitance is detected by a position sensor 80, such as an integrator or voltage buffer, which includes an amplifier 82. Finger 38 is connected to the negative input of amplifier 82. The output of amplifier 82 is connected to the negative input of the amplifier via an integrating capacitor 84 to form an integrator. The negative input of amplifier 82 is connected to ground via a parasitic capacitor 83. The positive input of amplifier 82 may be connected directly to ground.

Because capacitance cannot be measured with a DC voltage, a voltage source 90 applies an AC voltage $V_S$ between fingers 74a, 74b and 76a, 76b. The voltage $V_S$ is about 0.1 to 5.0 volts, preferably about one volt, and has a frequency much higher than the driving frequency $\omega_x$. For example, the frequency of voltage source 90 may be about one megahertz.

The integrator shown in FIG. 8A offers the flexibility of trading bandwidth for sensitivity by varying the integrating capacitor size. The integrator also provides lower distortion. Some of the parasitic capacitors involved in microelectromechanical systems are nonlinear which will vary the gain of a buffer and thereby result in distortion, and the practice of bootstrapping parasitic capacitance is a form of positive feedback which exacerbates amplifier distortion. However, because the integrator uses a fixed, linear capacitor, distortion is kept to a minimum.

Another common amplifier configurations used for capacitive position sensing is shown in FIG. 8B, in which the output of amplifier 82 is connected to its negative input and sensing electrodes 56 are connected to the positive input of the amplifier to form a voltage buffer.

Unfortunately, the integrator presents a difficult biasing problem. Ideally, biasing can be performed by placing a very large resistor in parallel with the integrating capacitor. However, any practical implementation of a large resistor results in a considerable parasitic capacitance. A diode can also be used in parallel with the integrating capacitance; however, that adds a nonlinear capacitance to the integrating capacitance resulting in distortion. Referring to FIG. 8C, this biasing problem has been solved by using a subthreshold metal oxide semiconductor field effect transistor (MOSFET) 88. The MOSFET device is connected in parallel with integrating capacitor 84 so that the source of MOSFET 88 is connected to the output of amplifier 82, the drain is connected to the negative input of amplifier 82, and the gate is connected to ground. The negative input of amplifier 82 may be connected to ground by a diode 86, and the positive input of amplifier 82 may be connected directly to ground. In the subthreshold regime, the MOSFET device exhibits extremely low transconductance and no source-to-drain capacitance. The use of subthreshold MOSFET device has resulted in a well behaved integrator operable down to 1 kHz with a 50 F integrating capacitor without additional noise or distortion attributable to the bias circuitry.

Referring to FIG. 9, gyroscopic sensor 20 includes a phase-locked loop (PLL) 100 and several synchronous demodulators or mixers to perform signal processing. Phase-locked loop 100 produces extremely accurate digital signals having a driving frequency $\omega_x$ between about 7 kHz and 100 kHz. The drive frequency, $\omega_x$, may be generated by dividing down the signal from voltage source 90. The phase-locked loop ensures that the position signals are exactly in phase with the position of proof mass 22. Phase-locked loop 100 may also generate a velocity signal on line 108 which is exactly ninety degrees out of phase with a position signal on line 110. Position signals on lines 102 and 104, having opposite amplitudes, are supplied by phase-locked loop 100 to the positive and negative outputs, respectively, of a transresistance amplifier 106. Opposing stationary drive electrodes 60a and 60b are also connected to the positive and negative outputs of transresistance amplifier 106. Opposing feedback electrodes 61a and 61b are connected to the positive and negative inputs of transresistance amplifier 106. One of the outputs of transresistance amplifier 106 is mixed with the velocity signal by a mixer 112. The combined output of mixer 112 is applied to transresistance amplifier 106 to provide an automatic gain control (AGC) circuit to control the amplitude of the oscillations of proof mass 22 along the X-axis. The phase accuracy of the phase-locked loop is critical to the operation of gyroscopic sensor 20 because any phase error will result in cross-talk between the Coriolis and quadrature signals. Assuming that a phase error $\theta_n(t)$ is generated by phase noise in the phase-locked loop, the error in the rotation rate $\Omega$ may be derived as shown in Equations 13–15 below:

$$y(t) = \left[\frac{X_0 \omega_x}{\omega_x \Delta \omega} \Omega \cos \omega t + Y_{Quadrature} \sin \Omega t\right] \quad (13)$$

$$\Omega_{est} = \frac{\omega_x \Delta \omega}{X_0 \omega_x} y(t) \cos(\omega_x t + \theta_n(t)) \quad (14)$$

$$\Omega_{est} = \Omega + \frac{\omega_x \Delta \omega}{X_0 \omega_x} Y_{Quadrature} \theta_n(t) + \text{Higher terms} \quad (15)$$

Because phase-locked loop 100 is extremely accurate, phase noise is minimized and variable cross-talk is extremely small. In addition, quadrature error correction reduces cross talk and phase noise.

The nulling of the quadrature error, the tuning of the Y-axis resonant frequency, and the balancing of the centrifugal forces is accomplished by the application of the proper voltages to fingers 70 of opposing stationary sensing electrodes 62a and 62b. Specifically, gyroscopic sensor 20 includes four DC bias voltage sources 120, 122, 124 and 126. Voltage source 120 applies a total voltage $V_r = V_{DC} + \Delta V + V_C$ to right fingers 74a of sensing electrode 62a. Voltage source 122 applies a total voltage of $V_{DC} - \Delta V - V_C$ to left fingers 76a. Voltage source 124 applies a total voltage of $V_{DC} - \Delta V + V_C$ to right electrode fingers 74b of sensing electrode 62b. Voltage source 126 applies a total voltage of $V_{DC} + \Delta V - V_C$ to left fingers 76b. Thus, voltage sources 120, 122, 124 and 126 provide all of the necessary bias voltages in order to nullify the quadrature error, select the desired Y-axis resonant frequency, and cancel any centrifugal or other low-frequency forces. Of course, any other combination of voltage sources providing the same effective total voltage to the fingers of the sensing electrodes could be used. Also, the voltages could be applied by different sets of fingers of the stationary sensing electrode, for example, $V_{DC}$ could be applied by one set of fingers and $\Delta V$ could be applied by another set of fingers.

In order to extract the position, Coriolis effect, and quadrature signals from capacitive position sensor 80, the signal from amplifier 82 is boosted by an oscillation amplifier 130 to produce an output signal on line 132. This output signal may be mixed with signals from a modulator or clock and the position and velocity signals from phase locked loop 100. Voltage source 90 may produce a high frequency, e.g., one megahertz clock signal on line 134. To generate the position signal, this clock signal is mixed with the output signal on line 132 by a mixer 136. In order to produce the Coriolis signal, the clock signal on line 134 is mixed with the velocity signal on line 108 by a mixer 140 to produce a combined signal on line 142. The combined signal on line 142 is then mixed with output signal on line 132 by a mixer 144 to produce the Coriolis signal. Finally, to produce the quadrature signal, the clock signal on line 134 is mixed with the position signal on line 110 by a mixer 150 to produce a combined signal on line 152. The combined signal on line 152 is then mixed with output signal on line 132 by a mixer 154 to produce the quadrature signal. The position, Coriolis and quadrature signals may be passed through low pass filters to filter out high frequency components.

Referring to FIG. 10, a gyroscopic sensor 20 was fabricated on a silicon substrate 24 using a combination of metal oxide semiconductor and microelectromechanical fabrication techniques. The transresistance amplifier and integrator were fabricated on the same die, and the remaining electronics was implemented off of the chip. The mechanical sensing element is about one millimeter across.

There are a number of possible noise sources in gyroscopic sensor 20. Principal among these are: Brownian noise, op-amp noise in the integrator, and phase locked loop phase noise. The Brownian noise, $\Omega_{nB}$, represents the fundamental limit on angular rate resolution and is given by:

$$\Omega_{nB} = \sqrt{\frac{kT\omega_y BW}{MQ\omega_x^2 X_0^2}} \quad (16)$$

where k is Boltzman's constant, T is the temperature, M is the mass of the proof mass, BW is the bandwidth of the gyroscopic sensor, and Q is the quality factor. As an example, consider a gyroscopic sensor with mass, M=0.2 μg, an oscillation amplitude $X_0$=1 μm, a quality factor, Q=10, 000, a bandwidth BW=100 Hz, a drive frequency $\omega_x$=20 kHz and a resonant frequency $\omega_y$=20 kHz. For this example, we find a Brownian noise floor $\Omega_{nB}$=0.06 deg/sec. Because the gyroscopic sensor is run in vacuum and has a high Q, Brownian noise is not the dominant noise source.

As shown by Equation 15, phase noise in the phase locked loop, represented by $\theta_n(t)$, can cause variable cross talk between quadrature and Coriolis signals. In gyroscopic sensor 20, this effect is kept to a minimum due to the low phase noise in the phase locked loop and nulled quadrature error.

The integrator op-amp noise is the dominant noise source in gyroscopic sensor 20. The input-referred noise, $\Omega_E$, of the op-amp noise is a function of the total capacitance, $C_T$, attached to the summing node of the integrator, and is given by:

$$\Omega_{nE} = \frac{C_T y_0 v_n}{C_S X_0 V_S} \Delta\omega \sqrt{2BW} = \frac{y_0 \Delta\omega}{X_0 V_S} \sqrt{\frac{32kTBW}{3\pi C_S f_T}} \quad (17)$$

where $f_T$ is the maximum operable frequency of the transistors in gyroscopic sensor 20. The electronic noise is at best $\Omega_{nE}$=0.08 deg/sec for a modest CMOS process with $f_T$=250 MHZ, a frequency mismatch $\Delta\omega$=1 kHz, a sense voltage $V_s$=1 volt, a sense capacitance $C_s$=100 fF, and the oscillation amplitude and finger spacing $X_0$=$y_0$=1 μm.

An initial characterization of the gyroscopic sensor response is shown in FIG. 11. FIG. 11 is a graph of the logarithm of the output voltage of the Coriolis signal, on the Y-axis, as a function of frequency, on the X-axis. The graph was produced by measuring the output Coriolis signal in response to a 1Hz, 5 deg/sec sine wave rotation. The gyroscopic sensor was operated with an oscillation frequency, $\omega_x$, of 12 kHz and a Y-axis resonant frequency, $\omega_y$, of about 12.5 kHz. The noise floor for this version of Z-axis vibratory rate gyroscopic sensor is 1 deg/sec/Hz$^{1/2}$.

Referring to FIG. 12, there is a measured mechanical resonant frequencies of proof mass 22 as a function of the DC bias voltage applied to the position sense fingers. FIG. 12 shows a graph of the resonant frequencies of proof mass 22 (on the Y-axis of the graph) as a function of the RMS voltage (on the X-axis of the graph) applied between fingers 38 and fingers 70. The RMS voltage is a combination of the DC bias voltage and the AC voltage generated by voltage source 90. The resulting electrostatic springs reduce the resonant frequency of the sense mode ($\omega_y$), raise the resonant frequencies of the out-of-plane modes, and leaves the driven mode ($\omega_x$) unaffected. As expected, the Y-axis resonant frequency drops as the bias voltage is increased and the oscillation frequency of proof mass 22 remains constant at 12 kHz. The resonant frequencies of the vertical and tipping modes increase with DC bias due to electrostatic levitation effects.

As discussed above, gyroscopic sensor 20 includes a means to null quadrature error. FIG. 13 shows a graph of the measured voltage, $V_{out}$ on the Y-axis, as a function of the voltage differential, $\Delta V$, on the X-axis, which is applied between right fingers 74a, 74b and left fingers 76a, 76b. Both the quadrature and rotation rate signals were plotted for a zero rotation rate as $\Delta V$ was adjusted. Measurements of the quadrature error and rotation rate signals demonstrate that the quadrature error signal can be controlled independently of the Coriolis signal.

Another embodiment of the gyroscopic sensor, in which the sensing and quadrature correction voltages are applied by different electrode fingers, is shown by FIG. 14. Referring to FIG. 14, a micromachined gyroscopic sensor 200 includes a proof mass 202 connected to a substrate 204 by a suspension system 206. The gyroscopic sensor 200 includes three major electronic elements: a drive system 210 used to sustain oscillation of proof mass 202 along the X-axis, a sensing systems 212 used to detect deflections of proof mass 202 along the Y-axis, and a quadrature correction system 214 used to cancel any quadrature error.

The proof mass 202 includes a rectangular outer stage 220 and a rectangular inner stage 222. Each corner of outer stage 220 is connected by a folded or J-shaped first flexure 224 to an anchor 226 which secures proof mass 202 and suspension system 206 to substrate 204. Similarly, each corner of inner stage 222 is connected to outer stage 220 by a second flexure 228. The first flexure 224 is designed to permit outer stage 220 to vibrate primarily along a Y-axis with respect to substrate 204, whereas second flexure 228 is designed to permit inner stage 222 to vibrate substantially along the X-axis with respect to outer stage 220. Several beams or crossbars 230 may connect opposing sides of inner stage 222.

The physical characteristics of gyroscopic sensor 200 are similar to those of gyroscopic sensor 20. The sensor may be about 0.5 to 2.0 millimeters on a side; the proof mass may have a total mass of about 0.1 to 0.5 micrograms; the flexible elements of the suspension system may be constructed of polysilicon and may have a width and a thickness on the order of two microns. The entire assembly may be fabricated using traditional integrated circuit fabrication techniques.

Referring to FIG. 14, the drive system 210 includes two driving electrodes 232a and 232b, and two feedback electrodes 234a and 234b, all connected to substrate 204. A plurality of electrode fingers 236 project along the X-axis from each feedback electrode and each drive electrode. A plurality of electrode fingers 238 project from inner stage 222 of proof mass 202 along the X-axis, and are interdigitated with electrode fingers 236 of the sense and drive electrodes.

As shown in FIG. 15, feedback electrodes 234a and 234b are connected to the positive and negative inputs, respectively, of a transresistance amplifier 240. The driving electrodes 232a and 232b are connected to the positive and negative outputs of transresistance amplifier 240, respectively, and to a phase-locked loop 242, as previously described with respect to FIG. 9.

The sensing system 212 includes a plurality of pairs of sense electrodes fingers aligned with the X-axis. Each pair of sense electrode fingers includes a right finger 244 and a left finger 246. A plurality of electrode fingers 248 are connected to outer stage 220 and are interdigited so that each electrode finger 248 is disposed between one right finger 244 and one left finger 246. A sense voltage source 250 (see FIG. 15) applies an AC voltage between the right fingers 244 and the left fingers 246.

Quadrature correction system 214 includes several sets of correction electrodes positioned near the center-line of the sensor and connected to the substrate. Each set of correction electrodes includes an upper left electrode 260, an upper right electrode 262, a lower left electrode 264, and a lower right electrode 266. Upper right electrode 262 and lower left electrode 264 may be a single electrode, as shown, or may be separate electrodes. A plurality of electrode fingers 268 extend from crossbars 230 and are interdigited with the connection electrodes. Specifically, each electrode finger 268 extends along the X-axis from crossbar 230 and is disposed between upper left electrode 260 and upper right electrode 262. Similarly, each electrode finger 268 extends along the X-axis from crossbar 230 and is disposed between lower left electrode 264 and lower right electrode 266.

Upper left electrode 260 is electrically connected to lower right electrodes 266, and upper right electrode 262 is electrically connected to lower left electrode 264.

A voltage source 270 (FIG. 15) applies a DC bias voltage between the correction electrodes 260, 266 and 262, 264. The voltage differential between the left and right electrodes creates a balancing force to counteract the quadrature error as discussed with respect to FIG. 7C. The remainder of the circuitry, including an integrator 280 and mixers 282–286 may be assembled and function in a manner similar to the circuitry discussed above with reference to FIG. 9.

Referring to FIG. 16, quadrature correction may be used to compensate for manufacturing flaws that occur in the fabrication of other sorts of gyroscopic sensors, such as X-axis and Y-axis gyroscopic sensors. A dual-axis vibratory gyroscope functions by generating and sensing Coriolis accelerations. The functional operation of the dual-axis vibratory gyroscope is illustrated by an equivalent spring-mass system. In a dual-axis gyroscopic sensor 290, a proof mass 292 is supported by a flexible suspension 294 from a frame 296. The proof mass is generally disc-shaped, and lies in a plane generally parallel to the surface of the substrate. The proof mass is oscillated about the Z-axis (the axis perpendicular to the surface of the substrate) by a drive torque $F_d$ with a frequency $\omega_Z$. If the frame rotates about a first axis parallel to the surface of the substrate, e.g., the Y-axis, at a rotation rate $\Omega_Y$, then the combination of this rotation and oscillation generates an oscillating Coriolis torque $F_c$ about a second axis parallel to the surface of the substrate and perpendicular to the first axis, i.e., the X-axis. This Coriolis force torque will tend to oscillate the proof mass about the X-axis at a frequency $\omega_X$. Thus, rotation of the proof mass about the Y-axis causes the proof mass to undergo a "see-saw" motion about the X-axis. Similarly, a rotation about the X-axis will induce a Coriolis oscillation about the Y-axis.

The Coriolis acceleration about the X-axis generated by rotation of the proof mass about the Y-axis is given by the following equation:

$$I_{xx}\theta_x + C_x\dot{\theta}_x + K_x\theta_x = -I_{zz}\Omega_y \times \theta_{z0}\omega_z \cos(\omega_z t) \quad (18)$$

where $\theta_x$ is the sense-axis tilt angle, $I_{xx}$ is the X-axis moment of inertia, $C_x$ is the damping co-efficient, $K_x$ is the spring constant, $\omega_z$ is the frequency of oscillation about the Z-axis, $I_{zz}$ is the Z-axis movement of inertia, and $\Omega_y$ is the rotation rate of the proof mass about the Y-axis. The angular oscillation of the rotor caused by the Coriolis acceleration can be thought of as an amplitude modulated signal with a carrier frequency $\omega_z$. The amplitude of the modulated signal is directly proportional to the Y-axis rotation rate $\Omega_y$. The equation for Coriolis acceleration about the Y-axis is essentially identical except that the x and y subscripts are reversed and the right-hand side of the equation is positive.

Referring to FIG. 17A, a dual-axis gyroscopic sensor 300 includes a generally ring-shaped proof mass 302 connected to a rigid frame or substrate 304 by a suspension system 306. Dual-axis gyroscopic sensor 300 measures the X-axis and Y-axis rotation rate; i.e., the rotation of the substrate about the axes parallel to the surface of substrate 304. Dual-axis gyroscopic sensor 300 includes three major electronic elements: a drive system 310 used to sustain oscillation of proof mass 302 about the Z-axis, a sensing system 312 used to detect deflections of proof mass 302 about the X-axis and Y-axis, and a quadrature correction system 314 used to cancel any quadrature error. The dual-axis gyroscopic sensor 300 may be fabricated using standard integrated circuit techniques.

The proof mass 302 includes a generally ring-shaped rotor 316. Rotor 316 may be a two micron thick polysilicon ring with an outer radius of about 250 microns and an inner radius of about 200 microns. The proof mass 302 is substantially symmetric about the X- and Y-axis.

The suspension system 306 may include four beams 320 which connect an inner edge 322 of the proof mass to an anchor 324 which secures rotor 316 to substrate 304. The beams 320 may also be constructed of polysilicon and may have a width and thickness on the order of two microns. Alternately, the suspension system may include a serpentine suspension with folded beams. In yet another version, the proof mass may be suspended by four beams connected to an outer edge of the rotor. A serpentine suspension system provides a lower natural frequency and can accommodate warping of the rotor.

Suspension systems 306 is designed to provide a torsional suspension for rotor 316 to allow rotation about the three perpendicular axes. However, suspension system 306 is designed to be rigid to translational accelerations along the X-axis and the Y-axis. Although rotor 316 may undergo translational acceleration along the Z-axis, the differential sensing scheme discussed below substantially cancels sensitivity to such accelerations.

For maximum mechanical sensitivity, the suspension system is designed to match the frequencies of all three rotational modes sufficiently well that electrostatic tuning may compensate for process variations during manufacture of the gyroscope sensor. In particular, the sense axis natural frequencies were designed to be about ten percent above the drive natural frequencies so that the sense frequencies may be down tuned to match the drive frequency.

A plurality of inner combs 330a–330d project inwardly from inner edge 322 of rotor 316. Each inner comb includes a spine 332 and a plurality of teeth 334 which project from both sides of the spine. The number and configuration of inner combs in FIG. 17A is merely illustrative. The dual axis gyroscope may include twelve inner combs, each having five teeth. Four outer combs 340a–340d project outwardly from an outer edge 326 of rotor 316. Each outer comb includes a spine 342 and a plurality of teeth 344 projecting from both sides of the spine. Although teeth 334 and 344 in FIG. 17A are illustrated as linear, as shown in FIG. 17B it is advantageous for the teeth to be constructed as portions of arcs from concentric circles.

As previously mentioned, drive system 310 induces oscillations of proof mass 302 about the Z-axis. The drive system 310 includes one or more drive electrodes 350a–350b and one or more feedback electrodes 352a–352b connected to substrate 304. Preferably, the drive and feedback electrodes are arranged in opposing pairs located on either side of each inner comb 330a–330d. Each feedback and drive electrode includes a plurality of teeth 354 which are interdigited with teeth 334 of the adjacent inner comb. Teeth 354 may have an arc length of approximately twenty microns and a width of approximately two microns. The drive electrodes of drive system 310 act as electrical, mechanical transducers. By application of an alternating voltage between the drive electrodes and the proof mass, the proof mass may be forced to oscillate about the Z-axis. Specifically, beams 320 may flex or bend so that rotor 316 may rotate.

Referring to FIG. 18, dual-axis gyroscopic sensor 300 includes a transresistance amplifier 366 which produces drive signals 362 and 364 having a driving frequency $\omega_z$ of about twenty to thirty kilohertz. Drive signals 362 and 364 are equal in magnitude but opposite in sign. phase-locked loop 360. A phase-locked loop 360 generates an extremely accurate digital output signal on line 368 which is in phase with the rotational rate of the proof mass. The opposing feedback electrodes 352a and 352b are connected to the positive and negative inputs of trans-resistance amplifier 366. The opposing drive electrodes 350a and 350b are connected to the positive and negative outputs 362 and 364 of trans-resistance amplifier 366 and to phase-locked loop 360. The positive and negative outputs of trans-resistance amplifier 366 are also mixed with the digital output signal on line 368 by a mixer 370. The output of mixer 370 is then used to modulate trans-resistance amplifier 366. This modulation provides an automatic gain control circuit to control the amplitude of the oscillations of proof mass 302. Thus, drive system 310 provides a phase-locked oscillation of constant amplitude to the proof mass and provides a clean signal for Coriolis demodulation.

Returning to FIG. 17A, sensing system 312 includes four sense electrodes 374a–374d (shown in phantom because they are located beneath the rotor 316). Each sense electrode is shaped as a quarter-pie section and may be formed of an n+ diffused region in substrate 304. Sense electrodes 374a and 374c are positioned along the X-axis whereas the sense electrodes 374b and 374d are positioned along the Y-axis. The Coriolis oscillation is measured by sensing the change in capacitance between rotor 316 and sense electrodes 374a–374d. For example, if the gyroscopic sensor rotates about the Y-axis, then the Coriolis force may cause the right portion of rotor 316 to move closer to sense electrode 374b and the left portion of rotor 316 to move farther away from sense electrode 374d. Thus, the capacitance between sense electrode 374b and rotor 316 increases whereas the capacitance between sense electrode 374d and rotor 316 decreases. Because each pair of opposing sense electrodes provides differential sensing, translation of the rotor up or down along the Z-axis does not change in sense output.

Referring to FIG. 18, a first sense voltage source 376 connects opposing sense electrodes 374a and 3743c, and a second sense voltage source 378 connects opposing sense electrodes 374b and 374d. The sense voltage sources 376 and 378 generate AC voltages with different modulation frequencies. For example, one voltage source may operate at 200 kHz and the other voltage source may operate at 300 kHz. In order to extract the position signals indicating the angular position of rotor 316 about the X-axis and Y-axis, proof mass 302 is electrically connected to an integrator 380. The integrator 380 may include a capacitor 381 having a capacitance of about 50 femtoFarrads. A benefit of integrator 380 is that it improves linearity.

The output of integrator 380 is demodulated with the signal from sense voltage source 376 by a mixer 382. The output from integrator 380 is also demodulated with the signal from sense voltage source 378 by a mixer 384. The outputs of mixers 382 and 384 are then demodulated by mixers 386 and 388 with the digital output signal on line 368 from phase-locked loop 360. The output of mixer 386 provides the angular rotation rate of the gyroscopic sensor about the X-axis, and the output of mixer 388 provides the rotation rate of the gyroscopic sensor about the Y-axis.

The combined mechanical and electrical sensitivity of dual-axis gyroscopic sensor 300 may be calculated according to the following equation:

$$\left|\frac{V_{out}}{\Omega_y}\right| = \left|\frac{\theta_x}{\Omega_y}\right|\left|\frac{V_{out}}{\theta_x}\right| = \left|\frac{2\theta_{x0}\omega_z}{\omega^2_x + \frac{j\omega_x\omega_z}{Q_x} - \omega^2_z}\right|\left|2\frac{\partial C}{\partial \theta_x}\frac{V_s}{C_I}\right| \quad (19)$$

were $V_s$ is the sense voltage, $C_i$ is the capacitance of the integrating capacitor, $Q_x$ is the quality of inverse damping coefficient, and $V_{out}$ is the voltage signal from the mixer. One drawback of the sensing system is that a small inherent voltage is generated at twice the drive frequency. However, this voltage is far from the sense modulation frequencies.

As described above, if dual-axis gyroscopic sensor 300 is rotating about an axis parallel to the surface of the substrate, then the oscillation of rotor 316 about the Z-axis induces an oscillation about the X-axis or Y-axis due to the Coriolis force. In an ideal device, rotor 316 is perfectly aligned so that the only motion caused by drive system 310 is within the X-Y plane. However, fabrication imperfections may cause rotor 316 to wobble as it undergoes rotation about the Z-axis. Specifically, even if the gyroscopic sensor 300 is not rotating about the X-axis or Y-axis, as rotor 316 rotates about the Z-axis, it may oscillate or wobble out of the X-Y plane. The wobble caused by the fabrication imperfections generates a false rotation rate measurement called quadrature error. The quadrature error in dual-axis gyroscopic sensor 300 is similar to the quadrature error in Z-axis gyroscopic sensor 20; the quadrature error and Coriolis acceleration are both sinusoidal signals centered at the frequency of oscillation and ninety degrees out of phase. Ideally, demodulation will eliminate the out-of-phase quadrature error. However, because the electronic components may have a small phase-lag, some percentage of the quadrature error will corrupt the measurement of the rotation rate.

Returning to FIG. 17A, quadrature correction system 314 includes eight correction electrodes 390a–390h. The correction electrodes are arranged in pairs with each outer comb 340a–340d surrounded by two opposing correction electrodes. For example, outer comb 340a is flanked by correction electrodes 390a and 390b. Each correction electrode has a plurality of teeth 392 which are interdigitated with the teeth of the outer combs. The quadrature correction system 314 may apply voltages to the correction electrodes 390a–390h in order to levitate teeth 344 of the outer combs and cancel the quadrature error.

Returning to FIG. 18, each pair of opposing correction electrodes may be connected to a DC offset voltage source. In addition, the correction electrodes on opposite sides of the rotor may be connected. For example, correction electrode 390a may be electrically connected to correction electrode 390f. A first DC voltage source 394 may connect electrode 390a to electrode 390b, and second DC voltage source 396 may connect correction electrode 390c and 390d. The DC offset may be selected to electrostatically levitate outer combs 340a–340d and thereby cancel the quadrature error.

Referring to FIG. 19, a portion of substrate 304 beneath teeth 344 and 392 may be an n+ diffused region to provide a control pad electrode 398. The control pad electrode 398 is electrically connected to proof mass 302. By applying a generally positive voltage to teeth 392 and a generally negative voltage to teeth 344 and control pad electrode 398, the electric field (shown by field lines 399) generates an upward force $F_z$ on teeth 344.

Returning to FIG. 17A, the correction electrodes 390a and 390f generate an upward force on the teeth on the left side of the rotor which is stronger than the upward force on the teeth on the right side of the rotor generated by electrodes 390b and 390e. This force imbalance creates a balancing torque which tends to rotate the rotor so that, absent the Coriolis force, it vibrates solely in the X-Y plane. Because the quadrature error results in a linear displacement, the balancing forces need to be proportional to the position of the proof mass about the Z-axis. The balancing torque $F_z$ is proportional to the overlapping area between teeth 344 and teeth 392. Because the overlapping area between teeth 344 and teeth 392 is directly proportional to the angular position of rotor 316, the balancing torque will also be proportional to the angular position of the rotor.

Referring to FIG. 20, another embodiment of dual-axis gyroscopic sensor 300' includes a modified quadrature correction system 314'. In quadrature correction system 314', four generally rectangular or wedge-shaped plates 340a'–340d' are connected to outer edge 326 of rotor 316. Two fixed electrode pads 390a' and 390b' are disposed on substrate 304 beneath each plate. The fixed electrode pads 390a' and 390b' may be formed of n+ diffused regions in the substrate. A DC offset voltage may be applied between each pair of electrode pads to correct the quadrature error. For example, a positive offset voltage may be applied so that the voltage of electrode pad 390b' is higher than the voltage of electrode pad 390a'. As rotor 316 rotates counter-clockwise and the plate 340a' moves rightwards, more of the plate will overlap electrode pad 390b', and thus the right side of the plate will be more attracted to the substrate than the left side of the plate. This will generate a torque which tends to rotate rotor 316 about the X-axis. The dual-axis gyroscopic sensor 300' otherwise functions in a manner similar to dual-axis gyroscopic sensor 300.

Referring to FIG. 21, in a gyroscopic sensor 400 the drive system, the sensing system, and the quadrature correction system use a single set of electrodes. Gyroscopic sensor 400 includes a proof mass 402 connected to a substrate 404 by a flexible suspension 406. A plurality of opposing electrode fingers 410a and 410b (only two opposing fingers are shown) project from proof mass 402 along the X-axis. Each electrode finger 410a is flanked by respective stationary electrode fingers 412a and 414a. Similarly, each electrode finger 410b is flanked by stationary electrode fingers 412b and 414b.

To sense the position of the proof mass along the Y-axis, a voltage source 420 applies a high-frequency (e.g., one megahertz) AC voltage between upper electrode fingers 412a, 412b and lower electrode fingers 414a, 414b. Proof mass 402 is electrically connected to an integrator 422. The output of integrator 422 provides a position signal.

To drive the proof mass along the X-axis, a voltage-controlled oscillator 426 is connected to apply an AC voltage with a frequency ω between the opposing electrode fingers 412a, 414a and 412b, 414b. The output of integrator 422 is applied to a phase-sensing circuit 428, and the output of phase-sensing circuit 428 controls the voltage-controlled oscillator 426.

The output voltage Vut from integrator 422 is $$V_{out} = \frac{Q_{struct}}{C_I} \quad (20)$$

where $Q_{struct}$ is the charge on the proof mass and $C_I$ is the capacitance of integrator 422. $Q_{struct}$ is given by the equation:

$$Q_{struct} = \frac{dC_s}{dy}\Delta y V_{sense} + \Delta C_x(t) V_F(t) \quad (21)$$

where $V_F(t)$ is AC portion of the forcing voltage, $C_x(t)$ is the changing capacitance on the forcing electrodes as the structure displaces along the X-axis, and $V_{sense}$ is the sense voltage applied by voltage source 420. Combining Equations 20 and 21 yields:

$$V_{out} = \frac{\Delta C_x(t) V_F(t)}{C_I} + \text{other terms} \quad (22)$$

If the forcing voltage $V_F(t)$ is $V_F\sin(\omega t)$ then the resulting displacement x(t) is given by the following equation:

$$x(t) = X_0(\omega, \omega_x) \sin(\omega t + \phi(\omega, \omega_x)) \quad (23)$$

where ω is the drive frequency, $\omega_x$ is the driven mode resonance frequency, $X_0(\omega, \omega_x)$ is the amplitude, and $\phi(\omega, \omega_x)$ is a phase difference. Because $\Delta Cx(t)$ is proportional to x(t), $$V_{out} = \frac{\Delta C_x(\omega, \omega_x)}{C_I} \sin(\omega t + \phi(\omega, \omega_x))\sin(\omega t) \quad (24)$$

and therefore $$V_{out} = \frac{\Delta C_x(\omega, \omega_x)}{2C_I}[\cos(\phi(\omega, \omega_x)) - \cos(2\omega t + \phi(\omega, \omega_x))] \quad (25)$$

When the drive frequency ω is equal to the resonant frequency $\omega_x$, the phase ø will be 90°. Because the cos$(\phi(\omega, \omega_x))$ term of Equation 25 produces a DC offset, phase-sensing circuit 428 can drive the frequency ω of voltage-controlled oscillator 426 to the resonant frequency $\omega_x$ by sensing when there is no DC offset. Thus, the drive voltage will remain phase locked with the position of the proof mass.

Quadrature error correction may be accomplished in gyroscopic sensor 400 by applying a DC voltage between electrode fingers 412a and 414a and an equal but opposite DC voltage between electrode fingers 412b and 414b.

Referring to FIG. 22, a micromachined gyroscopic sensor 500 may be fabricated using high-aspect-ratio single-crystal-silicon micromachining techniques to produce an extremely thick device. Gyroscopic sensor 500 includes a vibratory structure 502 connected to a rigid frame or substrate 504 at anchor points 511. Structure 502 is configured to vibrate in a plane parallel to a surface 505 of the substrate. As such, a gap of about 0.5 to 4.0 microns, such as about 1.0 microns, separates the vibratory structure from surface 505.

Structure 502 is generally H-shaped, and includes a proof mass portion 506 and a flexible suspension portion 508. The suspension portion includes two parallel crossbeams 516 and four parallel flexures 510 positioned generally along the X-axis. One end of each flexure is connected to anchor 511 which connects structure 502 to the substrate, and the other end of each flexure is connected to one of crossbeams 516. The total length of one crossbeam 516 and two flexures 510 may be about 200 to 1500 microns in length, preferably about 1250 microns.

Proof mass portion 506 includes two crossbars 512 connected to two beams 514 to provide a generally square arrangement. Three additional crossbars 512 are also connected between beams 514. A plurality of electrode teeth or fingers project along the X-axis from the crossbars 512. Four additional flexures 518 may connect flexures 510 to proof mass portion 506.

Structure 502 may be formed of single-crystal silicon. The structure 502 may have a thickness T of at least 25 microns, and it is advantageous for the thickness T to be at least 50 microns. The thickness may be between about 50 and 100 microns, but for some applications the thickness may be 250 microns. The flexures of the structure may have a width $W_F$ of about two to five microns. The aspect ratio, i.e., the ratio of width to thickness, of the flexures should be greater than 10:1, and it is advantageous for the aspect ratio to be greater than 20:1. The aspect ratio may even be 50:1 or more. The beams and crossbars of the proof mass portion may have a width $W_B$ of about five to ten microns. The total mass of structure 502 may be about 10 to 50 micrograms.

The suspension portion 508 is designed to be flexible along the X-axis and Y-axis and rigid to other modes of vibration. In particular, the high-aspect ratio of the flexures results in a structure which is very rigid to torsion and Z-axis acceleration.

Referring to FIG. 23, the micromachined gyroscopic sensor 500 includes four major electronic elements: a drive system 520 used to sustain oscillation of structure 502 along the X-axis, a sensing system 540 used both to detect deflections of structure 502 along the Y-axis, a sense tuning system 560 used to adjust the resonant frequency of structure 502 along the Y-axis, and a quadrature correction system 580 used to apply electrostatic forces to cancel quadrature error.

As shown in FIGS. 15 and 16, the drive system 520 includes two opposing driving electrode combs 522a and 522b and two feedback electrode combs 524a and 524b, all connected to substrate 504. Each driving electrode comb and feedback electrode comb includes a plurality of electrode teeth or fingers 526 which project along the drive axis and which are interdigited with electrode teeth or fingers 528 which project from structure 502. Electrode teeth 526 and 528 may have a length L of about fifteen microns, and a width $W_E$ of about two to six Microns. Electrode teeth 526 may be separated from electrode teeth 528 by a gap of about 2.5 microns. Electrode teeth 526 and 528 may be formed from the same layer of single-crystal silicon and have a thickness of about 100 microns.

The feedback electrodes combs 524a and 524b are electrically connected to the positive and negative inputs of a trans-resistance amplifier 530. The driving electrode combs 522a and 522b are connected to the positive and negative outputs, respectively, of the transresistance amplifier and to a phase-locked loop circuit 532. At least one of the outputs from transresistance amplifier 530 may be mixed with a velocity signal from phase-locked loop 532 by a mixer 534. The output of mixer 534 is then used to modulate transresistance amplifier 530 to provide an automatic gain control circuit to control the oscillation amplitude of structure 502.

The sensing system 540 includes an opposing pair of sense electrode combs, including left sense electrode combs 542a and 542b, and right sense electrode combs 544a and 544b. The left sense electrode combs 542a, 542b include a plurality of "left" electrode teeth 546, and the right sense electrode combs 544a, 544b include a plurality of "right" electrode teeth 548. The electrode teeth 546 and 548 are interdigited with electrode teeth 550 which project from structure 502 such that each electrode tooth 550 is disposed between one left tooth 546 and one right tooth 548.

Electrode teeth 546, 548 and 550 may have a length L of about fifteen microns, and width $W_E$ of about two to six microns. Electrode teeth 546, 548 and 550 have a thickness of at least 25 microns, and the thickness may be between about 50 and 100 microns. The aspect ratio of the electrode teeth should be at least about 5:1. The aspect ratio may be at least 10:1, and it may be between about 10:1 and 20:1. Electrode teeth 550 may be separated from electrode teeth 546 and 548 by a gap having a width $W_G$ between about 0.5 and 4.0 microns, such as 2.5 microns. The aspect ratio of the gap should be at least 10:1, and it may be greater than 20:1 or even greater than 50:1. Electrode teeth 546, 548 and 550 may be formed from the same layer of single-crystal silicon in the same fabrication step so that the teeth are coplanar.

A first sense voltage source 552 applies an AC voltage to left sense electrode combs 542a and 542b. A second sense voltage source 554 applies an AC voltage, 180° out of phase with the first sense voltage, to right sense electrode combs 544a and 544b. The sense voltage sources may generate AC signals having a maximum voltage of about 0.1 to 5.0 volts and a frequency of about 0.1 to 5.0 megahertz. The AC signals may have a voltage amplitude of one volt and a frequency of one megahertz.

To measure the Coriolis signal $\Omega_Z$, structure 502 is electrically connected to an integrator 556, and the output of integrator 556 is amplified by an AC amplifier 558. The signal from one of the sense voltage sources is mixed with a position signal from phase-locked loop 532 by a mixer 536. The output of mixer 536 is then mixed with the output of amplifier 558 by a mixer 538 to generate the Coriolis signal.

Tuning of the Y-axis resonant frequency may be accomplished sense tuning system 560 applying a DC bias voltage between a set of inner tuning electrodes 562 and outer tuning electrodes 564. Electrodes 566 project from structure 502 and are interdigited with the inner tuning electrodes 562 and outer tuning electrodes 564. A tuning voltage source 568 applies a bias voltage $V_{Afy}$ between inner tuning electrodes 562 and outer tuning electrodes 564. Alternately, the Y-axis resonant frequency could be tuned by applying a DC bias between the vibratory structure and the tuning electrodes.

Quadrature error cancellation is accomplished by applying a voltage between diagonal pairs of electrodes. The quadrature error correction system 580 includes a lower left electrode 582a, an upper left electrode 582b, a lower right electrode 584a, and an upper right electrode 584b. Lower left electrode 582a is connected to upper right electrode 584b, and upper left electrode 582b is connected to lower right electrode 584a. A quadrature correction voltage source 586 applies a bias voltage $2V_{Quad}$ between the electrode pairs 582a, 584b and 582b, 584a. The bias voltage creates a balancing force which is proportional to the position of the proof mass along the X-axis. This bias voltage may be determined experimentally (as shown in FIG. 13) and may be in the range of 1 mV to 100 mV.

In addition, quadrature error correction system 580 may include a feedback loop to automatically adjust the bias voltage. A velocity signal from phase-locked loop 532 may be mixed with a signal from one of the sense voltage sources by a mixer 590. The output of mixer 590 may be mixed with the output of amplifier 558 by a mixer 592. The output of mixer 592 may be used to control the voltage source 586.

Assuming that the mass M of structure 502 is 36 micrograms, the drive and sense frequencies $\omega_x$ and $\omega_y$ are each 63 kHz, the quality factor Q for single-crystal silicon is 200,000 (about three to four times higher than that of polysilicon), and the amplitude $X_0$ of the drive mode is five microns, then one may calculate from Equation 16 that, at room temperature, the Brownian noise $\Omega_{nB}$ for a bandwidth (BW) of 60 Hz is about 2 deg/hr.

The electronic noise floor is determined by the thermal noise level in charge integrator 556. Where the sense frequency $\omega_y$ is electrostatically tuned to the drive frequency $\Omega_x$ plus an offset frequency $\Delta\omega$, the electronic noise $\Omega_{nE}$ may be calculated from the equation:

$$\Omega_{nE} = 2\frac{g_0 \Delta\omega}{X_0 V_S} \sqrt{\frac{32}{3\pi}\left(\frac{k_B T}{C_S}\right)\frac{1}{f_T}\left(\left(1 + \frac{C_P}{C_S}\right)BW\right)} \quad (26)$$

where $g_0$ is the sense-capacitor gap width, $X_0$ is the oscillation amplitude, $V_S$ is the sense voltage, $k_B$. is Boltzmann's constant, T is the temperature, $C_S$ is the sense capacitance, $C_P$ is the parasitic capacitance, $f_T$ is the CMOS transition frequency, and BW is the bandwidth.

Assuming that the sense-capacitor gap $g_0$ is 2.5 microns, the sense voltage $V_S$ is 1 V, $C_S$ is the sense capacitance $C_S$ is 1.25 pF, the parasitic capacitance $C_P$ is 0.25 pF, and the CMOS transition frequency $f_T$ is 1 GHz, one may calculate from Equation 18 that a frequency offset $\Delta\omega$ of $2\pi(175\ Hz)$ is required to make the electronic noise floor equal to 2.5 deg/hr. This degree of tuning is feasible in principle because the measurement bandwidth is about 60 Hz.

By increasing the thickness of electrode teeth 546, 548 and 550, the surface area between the stationary and movable electrodes is increased, resulting in a larger sense capacitance. The larger sense capacitance reduces electronic noise. Similarly, the thicker structure is more massive and thus less subject to Brownian motion. In short, a gyroscopic sensor using high-aspect-ratio single-crystal silicon structures may be about one-hundred times more sensitive than a gyroscopic sensor using structures formed of thin polysilicon layers.

Fabrication of gyroscopic sensor 500 includes six basic steps: handle wafer processing, device wafer processing, bonding, CMOS processing of the bonded structure, etching to form the vibratory structure and stationary electrodes, and capping.

Referring to FIG. 24A, processing of a bottom substrate 600 may begin with a handle wafer 602, which may be a single-crystalline silicon substrate. Handle wafer 602 is oxidized to form an oxide layer 604, aid a polysilicon layer 606 is deposited on oxide layer 604. Polysilicon layer 606 is then doped, polished and patterned to form the interconnects for the electrically isolated electrodes 522a, 522b, 524a, 524b, 542a, 542b, 544a, 544b, 562, 564, 582a and 584b, and 582b and 584a, of the gyroscopic sensor.

Referring to FIG. 24B, processing of a top substrate 610 may begin with a device wafer such as a silicon-on-insulator (SOI) substrate. The device wafer includes an oxide layer 616 sandwiched between two single-crystal silicon layers 614 and 618. A shallow trench 620 is formed in a surface 622 of single-crystal silicon layer, except in regions 624. Regions 624 will form anchors 511 connecting vibratory structure 502 to substrate 504. Trench 620 may be formed by deposition of a photoresist mask, etching of the exposed portions of single-crystal silicon layer 614, and removal of the mask. Alternately, trench 620 may be formed by mechanical thinning.

The thickness of single-crystal silicon layer 614 will define the thickness of vibratory structure 502, and the depth of trench 620 will define the spacing between the vibratory structure and the substrate. Preferably, single-crystal silicon layer 614 is about 100 microns thick, and trench 620 is about one micron deep.

Referring to FIG. 24C, bottom substrate 600 and top substrate 610 are aligned with surface 622 of top substrate 610 abutting the patterned polysilicon layer 606 of bottom substrate 600. The top and bottom substrates are bonded so that trench 620 forms a sealed cavity 626 between the two substrates. Then, referring to FIG. 24D, top substrate 610 is thinned by etching or mechanical removal of single-crystal silicon layer 618 to expose oxide layer 616, and oxide layer 616 is stripped. At this point, the bonded assembly is ready for standard CMOS processing. Because sealed cavity 626 is completely internal, the bonded assembly appears as an unprocessed silicon wafer and may processed with conventional techniques.

Referring to FIG. 24E, the integrated circuitry of gyroscopic sensor 500 is fabricated on an exposed surface 630 of single-crystal silicon layer 614 in device regions 632. Following circuit fabrication, a thermocompression bond layer 634 is deposited and patterned. The bond layer 634 may be a conductive metal, such as gold.

Referring to FIG. 24F, the structures of the gyroscopic sensor are formed in single-crystal silicon layer 614. A photoresist mask is deposited over bond layer 634 and exposed surface 630, and the photoresist mask is patterned to define the gaps between the vibratory structure 502 and the stationary electrodes (not shown in this cross-sectional view). The single-crystal silicon layer 614 is etched using inductively-coupled plasma based deep reactive ion etching until cavity 626 is exposed. The etching step forms trenches 636 which create the free-standing vibratory structure and the various electrode structures of the gyroscopic sensor. Following the reactive ion etching, an oxygen plasma may be used to remove the photoresist mask, and the assembly may undergo a UV-ozone clean.

Finally, referring to FIG. 24G, a capping wafer 640 is aligned and bonded to top substrate 610. Capping wafer 640 may be glass or oxidized silicon. An underside 642 of the capping wafer may include a patterned thermocompression bond layer 644. Bond layer 634 may be aligned with bond layer 644, and the thermocompression bond may be formed by the application of a pressure of approximately 20 psi and a temperature of about 300–350° C. for several minutes. The capping wafer may also include an etched hole 646 that permits access to bonding pads 648 in device regions 632.

The present invention has been described in terms of a preferred embodiment. The invention, however, is not limited to the embodiment depicted and described. Rather, the scope of the invention is defined by the appended claims.

What is claimed is:

1. A method of fabricating a sensor, comprising:

forming an insulative layer on a first substrate;

forming a patterned conductive layer on the insulative layer;

forming a recess in a first surface of a second substrate;

bonding the first surface of the second substrate to the patterned conductive layer of the first substrate so that the recess defines an enclosed cavity between the first and second substrates;

forming a circuitry for the sensor on a second surface of the second substrate; and etching a plurality of trenches in the second substrate from the second surface of the cavity, the plurality of trenches defining a vibratory structure formed of the second substrate and conneted to the first substrate by the patterned conductive layer.

2. The method of claim 1 wherein the vibratory structure has a thickness of at least 25 microns.

3. The method of claim 1 wherein the recess has a depth of about 1 micron.

4. The method of claim 1 wherein the etching step comprises a deep reactive ion etch.

5. The method of claim 1 wherein the patterned conductive layer is polysilicon.

6. The method of claim 5 wherein the insulative layer is an oxide.

7. The method of claim 1 wherein the vibratory structure includes a component surrounded a trench so as to be electrically isolated from a remainder of the second substrate.

8. The method of claim 7 further comprising forming electrical connections to the component through the patterned conductive layer.

9. The method of claim 1 wherein the vibratory structure includes a plurality of components surrounded by trenches so as to be electrically isolated from each other, and the patterned conductive layer is patterned to electrically isolate the plurality of components from each other.

10. The method of claim 1 wherein the first and second substrates are single-crysta silicon.

11. The method of claim 1 wherein the second substrate includes a first side with a first single-crystal silicon layer, a second side with a second single-crystal silicon layer, and an insulator layer separating the first and second single-crystal silicon layers.

12. The method of claim 11 wherein the recess is formed in the first side of the second substrate in the first single-crystal silicon layer.

13. The method of claim 12 further comprising, after the bonding step, thinning the second side of the second substrate on the side of the second single crystal silicon layer until the first single crystal silicon layer is exposed.

14. The method of claim 1 further comprising bonding a capping substrate to the second surface of the second substrate.

15. The method of claim 14 wherein no trenches are formed in the first substrate.

16. A method of fabricating a sensor, comprising:

providing a first substrate;

providing a second substrate having a first single-crystal silicon layer on a first side, a second single-crystal layer on a second side, and an insulator layer between the first and second layer single-crystal silicon layers;

forming a recess in a first surface on the first side of the second substrate;

bonding the first side of the second substrate to the first substrate so that the recess defines an enclosed cavity between the first and second substrates;

thinning the second substrate on the second side until a second surface of the first single-crystal silicon layer is exposed;

forming circuitry for the sensory on the second surface of the second substrate; and etching a plurality of trenches in the second substrate from the second surface to the cavity, the plurality of trenches defining a vibratory structure formed of the second substrate and connected to the first substrate.

* * * * *